United States Patent
Ahn et al.

(10) Patent No.: US 9,080,000 B2
(45) Date of Patent: Jul. 14, 2015

(54) METHOD OF FORMING A NON-RANDOM COPOLYMER

(75) Inventors: Dongchan Ahn, Midland, MI (US); Corissa K. Lee, Gresham, OR (US); Christopher L. Wong, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 408 days.

(21) Appl. No.: 13/147,999

(22) PCT Filed: Feb. 2, 2010

(86) PCT No.: PCT/US2010/022852
§ 371 (c)(1), (2), (4) Date: Aug. 4, 2011

(87) PCT Pub. No.: WO2010/091001
PCT Pub. Date: Aug. 12, 2010

(65) Prior Publication Data
US 2011/0294958 A1    Dec. 1, 2011

Related U.S. Application Data

(60) Provisional application No. 61/149,787, filed on Feb. 4, 2009.

(51) Int. Cl.
*C08F 4/52* (2006.01)
*C08G 77/04* (2006.01)
(Continued)

(52) U.S. Cl.
CPC ............ *C08F 293/00* (2013.01); *C08F 4/52* (2013.01); *C08F 293/005* (2013.01); *C08L 53/00* (2013.01)

(58) Field of Classification Search
CPC .......... C08G 77/04; C08F 2/38; C08F 230/08
See application file for complete search history.

(56) References Cited

U.S. PATENT DOCUMENTS

| | | | |
|---|---|---|---|
| 3,413,274 A | 11/1968 | Hiroshi et al. | |
| 5,401,805 A | 3/1995 | Chung et al. | |

(Continued)

FOREIGN PATENT DOCUMENTS

| | | |
|---|---|---|
| JP | 2008-530338 A | 8/2008 |
| WO | WO 98/17694 A1 | 4/1998 |

(Continued)

OTHER PUBLICATIONS

Bandrup et al. The Polymer Handbook, Fourth edition, 1999.*
(Continued)

*Primary Examiner* — Mark Kaucher
(74) *Attorney, Agent, or Firm* — Howard & Howard Attorneys PLLC

(57) ABSTRACT

A non-random copolymer is formed, and its structure controlled, using a method including the step of combining a mixture of a first radical polymerizable compound and an organoborane initiator, a second radical polymerizable compound, and an organoborane decomplexing agent, at a rate sufficient to form the non-random copolymer. The non-random copolymer may be a silicon gradient polymer. To form the silicon gradient copolymer, the first and second radical polymerizable compounds are polymerized in the presence of the organoborane initiator and the organoborane decomplexing agent. The silicon gradient copolymer has a polymer backbone consisting of organic moieties and has at least one silicon containing pendent group.

23 Claims, 11 Drawing Sheets

(51) Int. Cl.
*C08F 230/08* (2006.01)
*C08F 293/00* (2006.01)
*C08L 53/00* (2006.01)

(56) References Cited

U.S. PATENT DOCUMENTS

| | | | |
|---|---|---|---|
| 5,539,070 | A | 7/1996 | Zharov et al. |
| 5,935,711 | A | 8/1999 | Pocius et al. |
| 6,248,837 | B1 | 6/2001 | Chung et al. |
| 6,252,023 | B1 | 6/2001 | Moren |
| 6,384,165 | B1 | 5/2002 | Moren |
| 6,420,502 | B1 | 7/2002 | Chung |
| 6,740,716 | B2 | 5/2004 | Webb et al. |
| 6,762,260 | B2 | 7/2004 | Sonnenschein et al. |
| 6,777,512 | B1 | 8/2004 | Sonnenschein et al. |
| 7,235,617 | B2 | 6/2007 | Webb et al. |
| 7,247,596 | B2 | 7/2007 | Jialanella et al. |
| 7,649,068 | B2 | 1/2010 | Ahn |
| 2002/0025381 | A1* | 2/2002 | Sonnenschein et al. ... 427/372.2 |
| 2002/0058764 | A1 | 5/2002 | Sonnenschein et al. |
| 2003/0096929 | A1* | 5/2003 | Olson et al. .................. 526/243 |
| 2004/0082743 | A1 | 4/2004 | Sonnenschein et al. |
| 2004/0198935 | A1 | 10/2004 | Webb et al. |
| 2005/0137370 | A1 | 6/2005 | Jialanella et al. |
| 2007/0079931 | A1 | 4/2007 | Feng et al. |
| 2007/0135601 | A1 | 6/2007 | Diakoumakos et al. |
| 2007/0141267 | A1 | 6/2007 | Sonnenschein et al. |
| 2008/0050552 | A1 | 2/2008 | Ahn et al. |
| 2008/0081195 | A1* | 4/2008 | Chung et al. .................. 428/421 |

FOREIGN PATENT DOCUMENTS

| | | |
|---|---|---|
| WO | WO 00/56779 A1 | 9/2000 |
| WO | WO 03/038006 A1 | 5/2003 |
| WO | WO 03/076485 A2 | 9/2003 |
| WO | WO 2005/044867 A1 | 5/2005 |
| WO | WO 2005/085297 A1 | 9/2005 |
| WO | WO 2006/073695 A1 | 7/2006 |
| WO | WO 2006/088571 A1 | 8/2006 |
| WO | WO 2007/044735 A2 | 4/2007 |
| WO | WO 2008/157020 A1 | 12/2008 |

OTHER PUBLICATIONS

English language abstract for JP 2008-530338 extracted from the espacenet.com database on Jan. 7, 2014, 32 pages.

Haisheng Xu et al., "Structural and ferroelectric response in vinylidene fluoride/trifluoroethylene/hexafluoropropylene terpolymers", Polymer 48 (2007), pp. 2124-2129.

Hans G. Borner et al., "Synthesis of Molecular Brushes with Gradient in Grafting Density by Atom Transfer Polymerization", Macromolecules (2002), 35, pp. 3387-3394.

Samuel J. Lord et al., "Tadpole Conformation of Gradient Polymer Brushes", Macromolecules (2004), 37, pp. 4235-4240.

George J. Jiang et al., "Block Copolymers via Borane Chemistry", Chung-Li, Taiwan 320, 2 pages, 1995.

Michelle M. Mok et al., "Microphase Seperation and Shear Alignment of Gradient Copolymers: Melt Rheology and Small-Angle X-Ray Scattering Analysis", Macromolecules (2008), Minneapolis, Minnesota, 12 pages.

J. Chojnowski et al., "Synthesis of Branched Polysiloxanes with Controlled Branching and Functionalization by Anionic Ring-Opening Polymerization", Macromolecules (2003), 36, pp. 3890-3897.

A.D. Jenkins et al., "Glossary of Basic Terms in Polymer Science", Pure & Appl. Chem., vol. 38, No. 12, pp. 2287-1996.

Christopher L. H. Wong et al., "Breadth of Glass Transition Temperature in Styrene/ Acrylic Acid Block, Random, and Gradient Copolymers: Unusual Sequence Distribution Effects", Journal of Polymer Science: Part B: Polymer Physics (2007), vol. 45, pp. 2842-2849.

Jungki Kim et al. Uniquely Broad Glass Transition Temperatures of Gradient Copolymers Relative to Random and Block Copolymers Containing Repulsive Comonomers, Macromolecules (2006), 39, pp. 6152-6160.

M. Maric et al., "Reactive Blending of Poly(dimethylsiloxane) With Nylon 6 and Poly(styrene): Effect of Reactivity on Morphology", Polymer Engineering and Science, Apr. 2001, vol. 41, No. 4, pp. 631-642.

U. Mukai et al., "Note: Micromechanical Testing of Toughness in Nylon 6/PDMS Block Copolymers and Blends", Polymer Engineering and Science, Mar. 1996, vol. 36, No. 6, pp. 895-897.

Mark F. Sonnenschein et al., "Physical and Chemical Probes of the Bond Strength between Trialkylboranes and Amines and Their Utility as Stabilized Free Radical Polymerization Catalysts", Macromolecules (2006), 39, pp. 2507-2513.

International Search Report for Application No. PCT/US2010/022852 dated Apr. 23, 2010, 4 pages.

Christopher L.H. Wong et al., "Comparison of Critical Micelle Concentrations of Gradient Copolymer and Block Copolymer in Homopolymer: Novel Characterization by Intrinsic Fluorescence", Macromolecules 2007, 40, (16), 5631-5633.

Michelle D. Lefebvre et al.,"Phase Segregation in Gradient Copolymer Melts", Macromolecules 2004, 37, (3), 1118-1123.

Kenneth R. Shull,"Interfacial Activity of Gradient Copolymers", Macromolecules 2002, 35, (22). 8631-8639.

* cited by examiner

Random

Block

Alternating

Tapered or Graded Block

Block with Random Mid-Block

Inverse Tapered Block

Gradient

METHOD OF FORMING A NON-RANDOM COPOLYMER

RELATED APPLICATIONS

This application claims priority to and all the advantages of International Patent Application No. PCT/US2010/022852, filed on Feb. 2, 2010, which claims priority to U.S. Provisional Patent Application No. 61/149,787, filed on Feb. 4, 2009.

FIELD OF THE INVENTION

The present invention generally relates to a method of forming a non-random copolymer. More specifically, the present invention relates to combining an organoborane initiator, first and second radical polymerizable compounds, and an organoborane decomplexing agent at a rate sufficient to form the non-random copolymer.

DESCRIPTION OF THE RELATED ART

Copolymers, also known as heteropolymers, are well known in the art and are derived from two (or more) monomers. Copolymers can be formed in many different configurations and may be classified as random copolymers or non-random copolymers. Examples of non-random copolymers include block, alternating, tapered block (also known as graded block or periodic), block with random mid-block, inverse tapered block, and gradient configurations, as set forth in FIGS. 1 and 2a-2f, respectively.

The copolymer configurations differ from each other based on differences in polymer backbones. For example, random copolymers have a backbone that includes a random sequence of two or more monomers. More specifically, random copolymers are copolymers that have no definite order of polymerized monomers in the polymer backbone. A probability of finding any particular polymerized monomer at a certain location is independent of adjacent polymerized monomers. Random copolymers are typically formed by polymerizing a first monomer in the presence of a second monomer with no control exerted over the order of polymerization or rate of polymerization of the first and second monomers to each other.

Apart from random copolymers, non-random copolymers can include gradient copolymers, as first introduced above. Gradient copolymers have a composition gradient along an entirety of the polymer backbone. As set forth in FIG. 2f, the composition gradient varies in type of monomer and typically includes a high concentration of a first monomer at a first end of the copolymer and a high concentration of a second monomer at a second end of the copolymer. As explained in C. L. H. Wong et al., *Macromolecules* 2007, 40 (16), 5631-5633, gradient copolymers exhibit a gradual change in monomer composition along an entire length of the polymer backbone or at least along a majority thereof. Gradient copolymers formed from monomers that individually would form homopolymers having disparate glass transition temperatures ($T_g$) typically exhibit at least one $T_g$ that has a broad breadth (i.e., a width of a glass transition peak as measured using DSC, DMA, or similar technique). The breadth of the $T_g$ is thought to arise from a variety of local chemical environments along the length of the polymer backbone which govern localized cooperative motion, as further described in both M. D. Lefebvre et al, *Macromolecules*, 2004, 37 (3), 1118-1123 and J. Kim et al., *Macromolecules*, 2006, 39 (18), 6152-6160. In addition, as explained in both K. R. Shull, *Macromolecules*, 2002, 35 (22), 8631-8639 and C. L. H. Wong et al., *Macromolecules* 2007, 40 (16), 5631-5633, a gradual change in the composition of the backbone of gradient copolymers is thought to result in a reduced interchain repulsion compared to other types of copolymers. The reduced interchain repulsion, in turn, is thought to provide the gradient copolymer with unique surfactant properties, (e.g. higher critical micelle concentrations (cmc)) that expand usefulness of the gradient copolymers in different applications such as in copolymer compatibilization applications.

Gradient copolymers are typically formed using living anionic radical polymerization or controlled radical polymerization (CRP) techniques such as atom transfer radical polymerization (ATRP), nitroxide-mediated CRP (NM-CRP), and reversible addition-fragmentation transfer (RAFT) polymerization. ATRP typically utilizes alkyl halides as initiators and simple transition metals as catalysts. NM-CRP utilizes reversible deactivation by coupling. RAFT polymerization utilizes a substitution of a termination reaction of polymer radicals by a reversible deactivation mechanism. While these methods offer reasonable control over formation of the gradient copolymers, these methods are time consuming and complex and are not able to form gradient copolymers efficiently because of procedural complexities and time intensive steps. In addition, ring opening metathesis polymerization (ROMP) is also used to form gradient copolymers, but only those formed from cyclic olefin comonomers. In sum, the aforementioned methods lead to increased production times, costs and/or production complexities.

Unlike gradient copolymers, block copolymers do not have a composition gradient along the entirety of the polymer backbone and instead include adjacent blocks of monomers, wherein each block includes only one type of monomer therein. Alternatively, each of the adjacent blocks may include units derived from a single species of monomer but with differing compositions or sequence distributions. Block copolymers may also include intermediate non-repeating subunits, known as junction blocks, to connect different blocks of the copolymer. Block copolymers having two or three distinct blocks are known in the art as di-block copolymers and tri-block copolymers, respectively.

Variations of standard block copolymers are also known in the art and include tapered (graded) block copolymers, inverse tapered block copolymers, and block copolymers including random mid-block segments, as set forth in FIGS. 2c-2e. Tapered block copolymers differ from standard block copolymers and do not include a precise step change. Rather, tapered block copolymers have a backbone that gradually and consistently changes in composition from one monomer to another. Inverse tapered block copolymers also have a backbone that changes in composition but does so less consistently. Block copolymers including mid-block random segments have a backbone that includes a concentration of a first type of monomer at a first end and a concentration of a second type of monomer at a second end. However, in the middle of the backbone, this type of copolymer includes random and interspersed monomer segments. Each of the block copolymer configurations typically includes at least two narrow distinct glass transition temperatures that correspond to the different monomer concentrations at the opposite ends of the block copolymer.

Block copolymers are typically formed by using living polymerization techniques, such as ATRP, RAFT, ROMP, and living cationic or living anionic polymerizations. As described above, these methods are difficult and time consuming and are not able to efficiently and accurately form block copolymers with specifically tailored physical and chemical properties. Use of these methods results in increased production complexities. Accordingly, there remains an opportunity to develop an improved method of forming non-random copolymers including both gradient and block copolymers.

SUMMARY OF THE INVENTION AND ADVANTAGES

The present invention provides a method of forming a non-random copolymer. The method includes the step of combining a mixture of a first radical polymerizable compound and an organoborane initiator, a second radical polymerizable compound, and an organoborane decomplexing agent, at a rate sufficient to form the non-random copolymer. The invention also provides a silicon gradient polymer.

This invention provides a simple and efficient method of forming a non-random copolymer and controlling its structure through a controlled rate of polymerization that allows for control of polymer "architecture." More specifically, the control of polymer architecture allows for the production of non-random copolymers with tailored physical and chemical properties such as surfactancy, mechanical dampening, mechanical reinforcement, energy absorption, and compatibilization. In addition, the method allows the formation of the non-random copolymers to proceed faster, with less expensive processing steps, and at low temperatures, e.g. room temperature, with a range of monomers thereby reducing costs while retaining versatility of free radical polymerization techniques. Furthermore, the method allows non-random copolymers to be formed with narrowed polydispersity indices, in high yields, and without the need for heavy metal catalysts.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides a method of forming a non-random copolymer via free radical polymerization and controlling a structure of the non-random copolymer. The invention also provides a silicon gradient copolymer formed via free radical polymerization.

As is known in the art, copolymers are polymers that include a polymerization product of more than one type of monomer, i.e., polymerizable compound. It is to be understood that the terminology "monomer" and "polymerizable compound" are used interchangeably herein. The non-random copolymer of the instant invention may be any copolymer that is not a random copolymer, such as those non-random copolymers set forth in FIGS. 2a-2f. More typically, the non-random copolymer of this invention is selected from the group of block copolymers, tapered block copolymers, gradient copolymers, and combinations thereof. Most typically, the non-random copolymer is further defined as either a block copolymer or a gradient copolymer. The non-random copolymers of this invention, such as the silicon gradient copolymer, may be used in a variety of applications including, but not limited to, as a compatibilizer.

Figure 1:
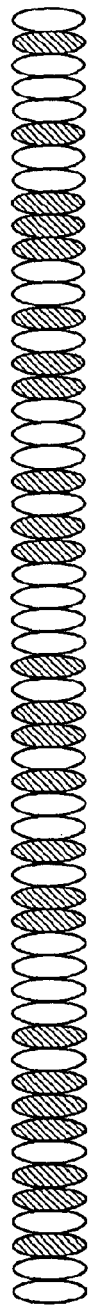
FIG. 1 is a schematic of random copolymers of the prior art.
Figure 2A:
FIG. 2a is a schematic of a non-random block copolymer.
Figure 2B:
FIG. 2b is a schematic of a non-random alternating copolymer.
Figure 2C:
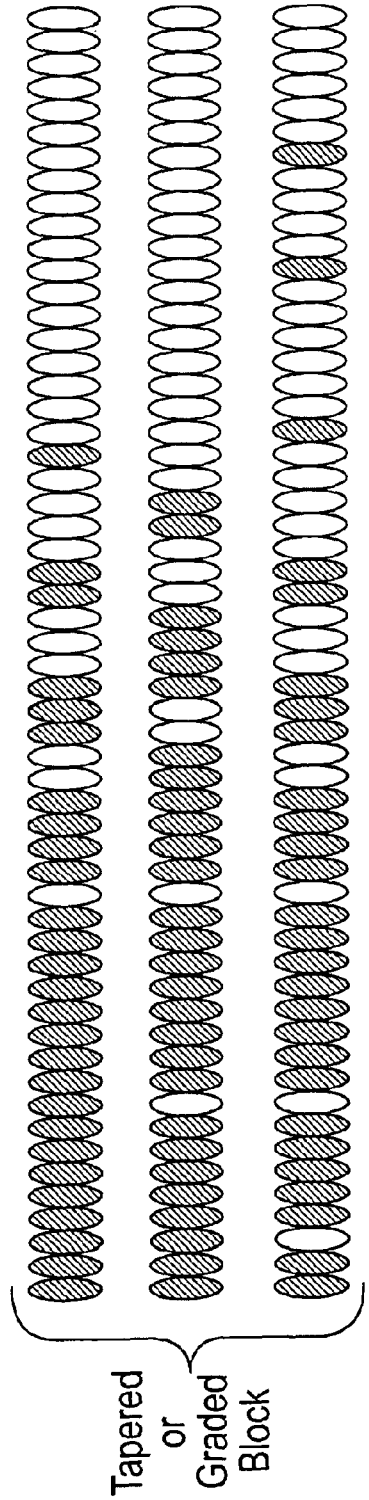
FIG. 2c is a schematic of a non-random tapered/graded block copolymer.
Figure 2D:
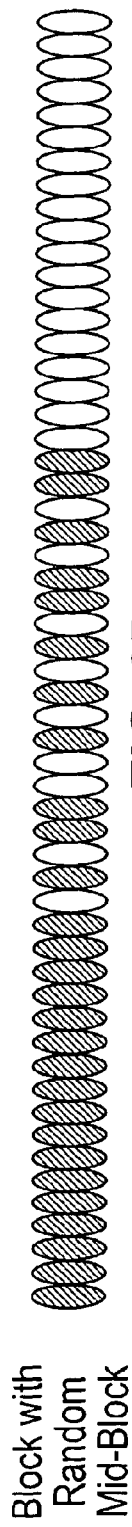
FIG. 2d is a schematic of a non-random block with random mid-block copolymer.
Figure 2E:
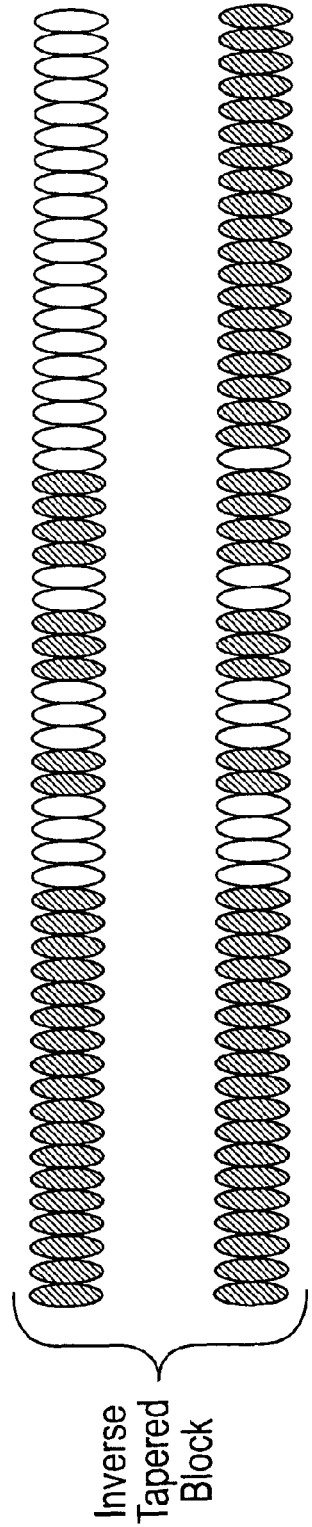
FIG. 2e is a schematic of a non-random inverse tapered block copolymer.
Figure 2F:
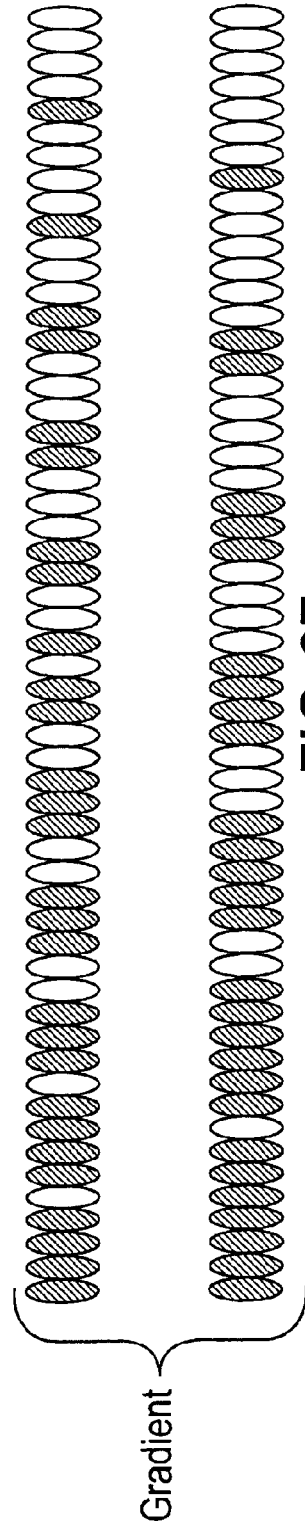
FIG. 2f is a schematic of a non-random gradient copolymer.

In one embodiment, the non-random copolymer is further defined as a gradient copolymer, as set forth in FIG. 2f. The instant invention also provides the silicon gradient copolymer itself, as first introduced above. As is known in the art, gradient copolymers have a polymer backbone and a composition gradient along an entirety of the polymer backbone. The composition gradient typically varies in type of monomer and typically includes a high concentration of a first monomer at a first end of the copolymer and a high concentration of a second monomer at a second end of the copolymer. In other words, the gradient copolymer exhibits a gradual change in monomer composition along an entire length of the polymer backbone or at least along a majority thereof.

Figure 9:
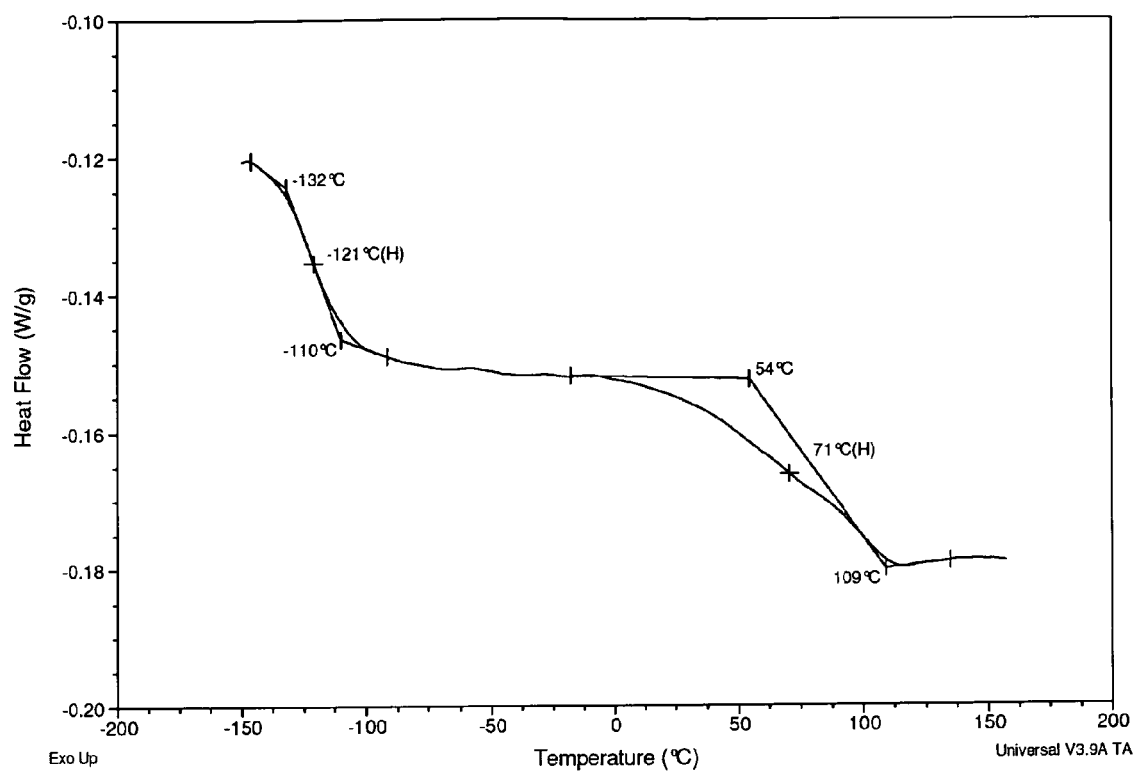
FIG. 9 illustrates results of differential scanning calorimetry of Non-Random Copolymer 3 of the instant Examples having two distinct glass transition temperatures with one glass transition temperature that has a breadth of 55° C.
Figure 10:
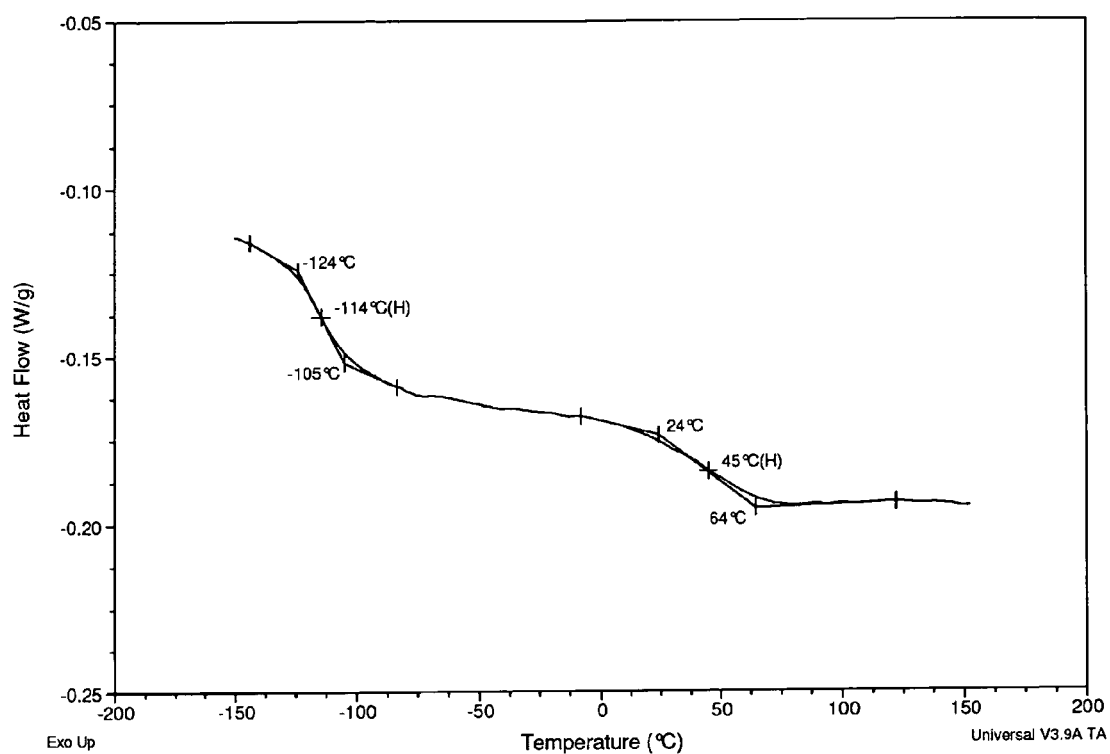
FIG. 10 illustrates results of differential scanning calorimetry of Non-Random Copolymer 4 of the instant Examples having two distinct glass transition temperatures with one glass transition temperature that has a breadth of 40° C.

Gradient copolymers formed from monomers that individually would form homopolymers having disparate glass transition temperatures ($T_g$) typically exhibit at least one $T_g$ that has a broad breadth (i.e., a width of a glass transition peak). The breadth of the $T_g$ is thought to arise from a variety of local chemical environments along the length of the polymer backbone which govern localized cooperative motion. The gradient copolymer of this invention may have a single glass transition temperature or more than one glass transition temperature. Typically, the gradient copolymer has at least one glass transition temperature ($T_g$) that has a breadth of greater than 20° C., as set forth in FIGS. 9 and 10. The glass transition temperatures of the non-random copolymers are typically determined using differential scanning calorimetry (DSC). As is well known in the polymer arts, DSC is a thermoanalytical technique in which a difference in an amount of heat required to increase a temperature of the non-random copolymer of this invention is compared to an amount of heat required to increase a temperature of a reference sample, as a function of temperature. Both the non-random copolymer and the reference are maintained at nearly the same temperature which increases linearly as a function of time. In various embodiments, the $T_g$ of the non-random copolymer of this invention has a breadth of greater than 25° C., greater than 30° C., of from 30° C. to 155° C., of from 35° C. to 155° C., of from 35° C. to 100° C., of from 35° C. to 80° C., of from 50° C. to 80° C., or of from 65° C. to 80° C., measured using DSC with a heating ramp rate of 10° C./min according to ASTM E1356. The breadth of the $T_g$ is measured as a difference between an extrapolated endset temperature and an extrapolated onset temperature as defined in ASTM E1356. Without intending to be bound by any particular theory, it is believed that this breadth of the $T_g$ arises, at least in part, from the composition gradient along the polymer backbone.

In other embodiments, the gradient copolymer has a first glass transition temperature observed in a range of from –140° C. to –95° C., –130° C. to –100° C., –130° C. to –110° C., or –130° C. to –120° C., measured as the extrapolated onset temperature using DSC with a heating ramp rate of 10° C./min according to ASTM E1356. In all further references to glass transition temperature, it is to be understood that the glass transition temperatures are measured as the extrapolated onset temperature using DSC with a heating ramp rate of 10° C./min according to ASTM E1356, as described above. The gradient copolymer may also have a second (or additional) glass transition temperatures observed in a range of from 0° C. to 100° C., 30° C. to 100° C., or 90° C. to 100° C., measured using DSC with a heating ramp rate of 10° C./min according to ASTM E1356, as described above. Of course, it is to be understood that the aforementioned glass transition temperatures do not limit the instant gradient copolymer, which may have glass transition temperature(s) known in the art.

In alternative embodiments, the gradient copolymer has a polydispersity index (PDI) of less than or equal to 5.0, 4.0, 3.0, or 2.0, as determined using gel permeation chromatography (GPC) relative to polystyrene (PS) standards in THF with a flow rate of 1 mL/min. However, it is to be understood that the gradient copolymer may have a PDI of greater than 5.0. In one embodiment, the gradient copolymer has a PDI of less than 2.5. As is known in the art, the polydispersity index is a ratio of a weight average molecular weight to a number average molecular weight of the gradient copolymer. In other embodiments, the gradient copolymer has polydispersity indices of less than or equal to 2.0, 1.9, 1.8, 1.7, 1.6, and 1.5, as determined using GPC. In some embodiments, the gradient copolymer has a PDI of from 1 to 1.9, as determined using GPC. In other embodiments, the gradient copolymer has a PDI of approximately 1.3, as determined using GPC. In still other embodiments, the gradient copolymer has a PDI of from about 1 to about 1.5, as determined using GPC. The PDI of the instant gradient copolymer evidences efficient, accurate, and consistent production of the gradient copolymer and the ability to produce gradient copolymers with tailored physical and chemical profiles for numerous applications. The gradient copolymer also typically has a number average molecular weight ($M_n$) of from 5,000 to 10,000,000, more typically of from 6,000 to 200,000, and most typically of from 7,500 to 150,000, g/mol, as determined using the GPC described above.

In another embodiment, the non-random copolymer is further defined as an alternating copolymer, as set forth in FIG. 2b. Typically, alternating copolymers are formed from monomers with specific reactivity ratios wherein a first monomer typically reacts only with a second monomer and vice versa.

In an alternative embodiment, the non-random copolymer is further defined as a block copolymer, as set forth in FIG. 2a. The block copolymer may be selected from the group of tapered (graded) block copolymers, block with random mid-block copolymers, inverse tapered block copolymers, and combinations thereof, as set forth in FIGS. 2c-2e, respectively. As is known in the art, block copolymers differ from gradient copolymers and do not have a composition gradient along the entirety of a polymer backbone. Block copolymers typically include two or more blocks of differing types of monomers. More typically, block copolymers have a block of a first type of monomer at a first end and a concentration of a second type of monomer at a second end. In one embodiment, the block copolymer is further defined as having two distinct blocks and is known as a di-block copolymer. Alternatively, the block copolymer may be further defined as a copolymer in which repeating units in a main chain occur in homopolymer blocks represented by A and B to form a structure $(A)_m$-$(B)_n$-$[(A)_p$-$(B)_q]_x$, where a and b represent the repeating units and m and n are each greater than 1, and p, q and x can be greater than or equal to zero.

In another embodiment, the block copolymer is further defined as having three distinct blocks and is known as a tri-block copolymer. Typically, block copolymers include ordered structures such as microphase- or nanophase-separated systems with domains that have narrow interfacial widths. Block copolymers may also include intermediate non-repeating subunits, known as junction blocks, to connect different blocks of the block copolymer.

The block copolymer of this invention may have a single glass transition temperature or more than one glass transition temperature. Block copolymers typically have two or more glass transition temperatures that correspond to two or more monomer blocks, respectively. The block copolymer of the instant invention typically has first and second glass transition temperatures that each has breadths of less than 25° C., measured using DSC with a heating ramp rate of 10° C./min according to ASTM E1356, as described above. In various embodiments, the breadths are less than 25° C., 20° C., 15° C., 10° C., and 5° C., measured using DSC and ASTM E1356, as described above. In additional embodiments, the block copolymer has two glass transition temperatures that overlap with each other and have midpoint temperatures that are within about 5° C., 10° C., 15° C., 20° C., or 25° C. of each other, measured using DSC and ASTM E1356, as described above. In other embodiments, the block copolymer has a first glass transition temperature observed in a range of from −140° C. to −95° C., −130° C. to −100° C., −130° C. to −110° C., or −130° C. to −120° C., measured using DSC and ASTM E1356, as described above. The block copolymer may also have one or more glass transition temperatures observed in a range of from −20° C. to 300° C., −10° C. to 150° C., or −10° C. to 130° C., measured using DSC and ASTM E1356, as described above. In other embodiments, the block copolymer has a second glass transition temperature observed in a range from 90° C. to 150° C., 10° C. to 70° C., 15° C. to 60° C., 13° C. to 19° C., or 40° C. to 55° C., measured using DSC and ASTM E1356, as described above. Of course, it is to be understood that the block copolymer may have any first or second glass transition temperature or temperature range within the aforementioned ranges, respectively. It is also to be understood that these first and second glass transition temperatures do not limit the instant block copolymer, which, alternatively, may have any first or second glass transition temperature known in the art.

In alternative embodiments, the block copolymer has a PDI of less than or equal to 5.0, 4.0, 3.0, or 2.0, as determined using GPC, as described above. However, it is to be understood that the block copolymer may have a PDI of greater than 5.0. In one embodiment, the block copolymer has a PDI of less than or equal to 1.9, as determined using gas chromatography. In other embodiments, the block copolymer has polydispersity indices of less than or equal to 1.8, 1.7, 1.6, and 1.5, as determined using GPC as described above. In some embodiments, the block copolymer has a PDI of from 1 to 1.5, as determined using GPC as described above. In other embodiments, the block copolymer has a PDI of approximately 1.3, as determined using GPC as described above. In still other embodiments, the gradient copolymer has a PDI of from about 1 to about 1.5, as determined using GPC. Just as described above, PDI of the block copolymer evidences efficient, accurate, and consistent production of the block copolymer and the ability to produce block copolymers with tailored physical and chemical profiles for numerous applications. The block copolymer typically also has a number average molecular weight ($M_n$) of from 5,000 to 10,000,000, more typically of from 6,000 to 200,000, and most typically of from 7,500 to 150,000, g/mol, as determined using the GPC method described above.

Referring back, the silicon gradient copolymer of this invention includes a polymerization product of a first radical polymerizable compound including at least one silicon (Si) atom and a second radical polymerizable compound. The first radical polymerizable compound and the second radical polymerizable compound are polymerized in the presence of an organoborane initiator and an organoborane decomplexing agent, each of which are described in greater detail below. In certain embodiments, the silicon gradient copolymer has a polymer backbone consisting of organic moieties and has at least one silicon-containing group pending from the polymer backbone. The organic moieties may be any known in the art. The silicon-containing group can also be any known in the art and typically is selected from the group of polysiloxanes, polysilanes, and combinations thereof. Any of the polysiloxanes and polysilanes disclosed herein may be the silicon-containing group. In addition, the silicon gradient copolymer may have any PDI, $T_g$, or breadth of $T_g$, as described above relative to the gradient copolymer. The silicon gradient copolymer, the gradient copolymer described above, the block copolymer, and/or any other non-random copolymer known in the art, may be formed by the method of this invention.

The instant method of forming the non-random copolymer includes the step of combining (1) a mixture of the first radical polymerizable compound and the organoborane initiator, (2) the second radical polymerizable compound, and (3) the organoborane decomplexing agent, at a rate sufficient to form the non-random copolymer. The first radical polymerizable compound and the second radical polymerizable compound are different from one another but both may be organic and/or may include silicon atoms. Typically, the first radical polymerizable compound is reacted in amounts of from 10 to 90, more typically of from 20 to 80, and most typically of from 25 to 75, parts by weight per 100 parts by weight of a sum of all radical polymerizable compounds used to form the non-random copolymer.

As described immediately above, the first radical polymerizable compound may be organic and free of silicon atoms or may include silicon atoms. The first radical polymerizable compound may be any known in the art and may be a monomer, dimer, oligomer, pre-polymer, polymer, or macromonomer, including unsaturation and capable of undergoing free radical polymerization.

In one embodiment, the first radical polymerizable compound is substantially free of silicon, i.e., the first radical polymerizable compound does not include any silicon compounds that materially affect the basic and novel characteristics of the non-random copolymer. It is to be understood that the terminology "substantially free" refers to a concentration of silicon of less than 5,000, more typically of less than 900, and most typically of less than 100, parts of compounds that include silicon, per one million parts of the first radical polymerizable compound. Alternatively, the first radical polymerizable compound may be completely free of silicon.

The first radical polymerizable compound may be selected from the group of acrylates, methacrylates, vinyl ethers, alkenoates, (meth)acrylamides, carbonates, phthalates, acetates, itaconates, halogen substituted homologs thereof, and combinations thereof. In one embodiment, the first radical polymerizable compound includes an acrylate. Suitable examples of acrylates include, but are not limited to, 2-ethylhexylacrylate, 2-ethylhexylmethacrylate, methylacrylate, methylmethacrylate, butylacrylate, ethylacrylate, hexylacrylate, isobutylacrylate, butylmethacrylate, ethylmethacrylate, isooctylacrylate, decylacrylate, dodecylacrylate, vinyl acrylate, acrylic acid, methacrylic acid, neopentylglycol diacrylate, neopentylglycoldimethacrylate, glycidyl acrylate, glycidyl methacrylate, allyl glycidyl ether, allyl acrylate, allyl methacrylate, stearyl acrylate, stearyl methacrylate, tetrahydrofurfuryl acrylate, 2-hydroxyethyl acrylate, 2-hydroxyethyl methacrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, N-vinyl pyrrolidone, N-vinyl caprolactam, N-isopropyl acrylamide, N,N-dimethyl acrylamide, t-octyl acrylamide, cyanotethylacrylates, diacetoneacrylamide, N-vinyl acetamide, N-vinyl formamide, bisphenol A dimethacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, N-vinyl pyrrolidone, N-vinyl caprolactam, N-isopropyl acrylamide, N,N-dimethyl acrylamide, t-octyl acrylamide, cyanotethylacrylates, diacetoneacrylamide, N-vinyl acetamide, N-vinyl formamide, and combinations thereof. The first radical polymerizable compound may include only acrylate or methacrylate functionality. Alternatively, the first radical polymerizable compound may include both acrylate functionality and methacrylate functionality. Typically, compounds having more than one radical polymerizable group can be used but are preferably used in low molar amounts to avoid cross-linking.

Referring back to the alkenoates above, suitable examples of alkenoates include, but are not limited to, alkyl-N-alkenoates, methyl-3-butenoate, and combinations thereof. Suitable examples of carbonates include, but are not limited to, alkyl carbonates, allyl alkyl carbonates such as allyl methyl carbonate, diallyl pyrocarbonate, diallyl carbonate, and combinations thereof. Suitable itaconates for use in the present invention include, but are not limited to, alkyl itaconates such as dimethyl itaconate. Non-limiting examples of suitable acetates include alkyl acetates, allyl acetates, allyl acetoacetates, and combinations thereof. Non-limiting of examples of phthalates include, but are not limited to, allyl phthalates, diallyl phthalates, and combinations thereof.

The first radical polymerizable compound may also include macromonomers having an average of at least one radical polymerizable group per molecule. Suitable examples include acrylate or methacrylate tipped organic compounds, compounds having an average of one acrylate or methacrylate functional group per molecule, etc. Suitable organic compounds that may be functionalized with acrylate or methacrylate groups include, but are not limited to, hydrocarbon based polymers such as polyisobutylene, polybutadienes, polyisoprenes, polyolefins such as polyethylene, polypropylene and polyethylene polypropylene copolymers, polystyrenes, styrene butadiene, and acrylonitrile butadiene styrene, polyacrylates, polyurethanes, polyethers such as polyethylene oxide and polypropyleneoxide, polyesters such as polyethylene terephthalate and polybutylene terephthalate, polyamides, polycarbonates, polyimides, polyureas, polymethacrylates, partially fluorinated or perfluorinated polymers such as polytetrafluoroethylene, fluorinated rubbers, terminally unsaturated hydrocarbons, olefins, polyolefins, and combinations thereof. In one embodiment where the macromonomer is monofunctional in radical polymerizable units, the macromonomer itself also includes copolymers, different from the non-random copolymer of this invention. Also useful are a class of conductive monomers, dopants, oligomers, polymers, and macromonomers having an average of at least one free radical polymerizable group per molecule, and the ability to transport electrons, ions, holes, and/or phonons. Non-limiting examples include, but are not limited to, 4,4'4''-tris[N-(3(2-acryloyloxyethyloxy)phenyl)-N-phenylamino]triphenylamine, and 4,4'4''-tris[N-(3(benzoyloxyphenyl)-N-phenylamino]triphenylamine. It is also contemplated that the first radical polymerizable compound may include compounds including acryloxyalkyl groups such as an acryloxypropyl group, methacryloxyalkyl groups such as a methacryloxypropyl group, and/or unsaturated organic groups including, but not limited to, alkenyl groups having 2-12 carbon atoms including vinyl, allyl, butenyl, and hexenyl groups, alkynyl groups having 2-12 carbon atoms including ethynyl, propynyl, and butynyl groups, and combinations thereof. The unsaturated organic groups may include radical polymerizable groups in oligomeric and/or polymeric polyethers including an allyloxypoly(oxyalkylene) group, halogen substituted analogs thereof, and combinations thereof.

The first radical polymerizable compound may also include compounds including a functional group incorporated in a free radical polymerizable group. These compounds may be monofunctional or multifunctional with respect to a non-radical reactive functional group and may allow for polymerization of the first radical polymerizable compound to linear polymers, branched polymers, copolymers, cross-linked polymers, and combinations thereof. The functional group may include any known in the art used in addition and/or condensation curable compositions such as unsaturated groups, hydroxyl groups, ester groups, etc.

Further, the first radical polymerizable compound may be a liquid, a gum, or a solid, and may have any viscosity. If the first radical polymerizable compound is a liquid, the viscosity may be equal to or greater than 0.001 Pa·s at 25° C. If the first radical polymerizable compound is a gum or a solid, the first radical polymerizable compound may become flowable at elevated temperatures, by application of shear, or by dilution in a suitable diluent or solvent.

Alternatively, the first radical polymerizable compound may include silicon (Si) atoms. In other words, the first radical polymerizable compound may include at least one silicon atom. In one embodiment, the first radical polymerizable compound is selected from the group of organosilanes, organopolysiloxanes, and combinations thereof. Alternatively, the first radical polymerizable compound may include compounds selected from the group of organosilanes, organopolysiloxanes, and silicone-acrylates. These compounds may include acryloxyalkyl- and methacryloxyalkyl-functional silanes (such as acrylic functional silanes) and acryloxyalkyl- and methacryloxyalkyl-functional organopolysiloxanes. It is to be understood that acryloxyalkyl, for purposes of the present invention, is equivalent to acryloyloxyalkyl. These compounds may also have an average of at least one, or at least two, free radical polymerizable groups per molecule. The average concentration of radical polymerizable groups in the compound can range from 0.1 to 50 mole percent of the free radical polymerizable groups including unsaturated organic moieties. The unsaturated organic groups may include, but are not limited to, alkenyl groups, alkynyl groups, acrylate-functional groups, methacrylate functional groups, and combinations thereof. "Mole percent" of the unsaturated organic groups is defined as a ratio of a number of moles of unsaturated organic groups including siloxane moieties in these compounds to a total number of moles of siloxane moieties in the first radical polymerizable compound, multiplied by 100.

Alternatively, the first radical polymerizable compound may include an organosilane having the general structure:

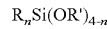

$$R_nSi(OR')_{4-n}$$

wherein n is an integer of less than or equal to 4 and wherein at least one of R and R' independently includes the free radical polymerizable group. If only one of the R and/or R' includes the free radical polymerizable group, the other may include a monovalent organic group free of aliphatic unsaturation. The R and/or R' may each independently include one of a hydrogen, a halogen atom, and an organic group including, but not limited to, alkyl groups, haloalkyl groups, aryl groups, haloaryl groups, alkenyl groups, alkynyl groups, acrylate and methacrylate groups. The R and/or R' may also each independently include other organic functional groups including, but not limited to, glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, hydroxyl groups, and combinations thereof. The monovalent organic group typically has from 1 to 20 and more typically from 1 to 10, carbon atoms. The monovalent organic group may include alkyl groups including, but not limited to, methyl, ethyl, propyl, pentyl, octyl, undecyl, octadecyl groups, and combinations thereof. The monovalent organic group may also include cycloalkyl groups including, but not limited to, a cyclohexyl group. The monovalent organic group may further include aryl groups including, but not limited to, phenyl, tolyl, xylyl, benzyl, 2-phenylethyl groups, and combinations thereof. The monovalent organic group may still further include an alkyloxypoly(oxylalkylene) group including, but not limited to, propyloxypoly(oxyethylene), propyloxypoly(oxypropylene), propyloxy-poly(oxypropylene)-co-poly(oxyethylene), halogen substituted versions thereof, and combinations thereof. Additionally, the monovalent organic group may include a cyanofunctional group including, but not limited to, a cyanoalkyl group including a cyanoethyl group, a cyanopropyl group, and combinations thereof. The monovalent organic group may also include a halogenated hydrocarbon group including, but not limited to, 3,3,3-trifluoropropyl, 3-chloropropyl, dichlorophenyl, and 6,6,6,5,5,4,4,3,3-nonafluorohexyl groups, and combinations thereof. The monovalent organic group may still further include carbazole groups such as 3-(N-carbazolyl)propyl, arylamino-functional groups such as 4-(N,N-diphenylamino)phenyl-3-propyl, and halogenated hydrocarbon groups such as 3,3,3-trifluoropropyl, 3-chloropropyl, dichlorophenyl, and 6,6,6,5,5,4,4,3,3-nonafluorohexyl. Typically, the radical polymerizable group includes an aliphatic unsaturated group in which at least one double bond is located at a terminal position, an internal position, or at both the terminal and the internal positions. Alternatively, the radical polymerizable group includes acrylate groups or methacrylate groups.

It is also contemplated that the first radical polymerizable compound may include, but is not limited to, 3-methacryloxypropyltrimethoxysilane, methacryloxymethyltrimethoxysilane, 3-methacryloxypropyltriethoxysilane, 3-acryloxypropyltrimethoxysilane, acryloxymethyltrimethoxysilane, 3-methacryloxypropyltrimethylsilane, 3-methacryloxypropyldimethylmonomethoxysilane, 3-methacryloxypropylmethyldimethoxysilane, 3-acryloxypropyltriethoxysilane, 3-acryloxypropyldimethylmonomethoxysilane, 3-acryloxylpropyltrimethylsilane, vinyltrimethoxysilane, allyltrimethoxysilane, 1-hexenyltrimethoxysilane, tetra-(allyloxysilane), tetra-(3-butenyl-1-oxy)silane, tri-(3-butenyl-1-oxy) methylsilane, di-(3-butenyl-1-oxy)dimethylsilane, 3-butenyl-1-oxy trimethylsilane, and/or combinations thereof.

In one embodiment, the first radical polymerizable compound is further defined as a polyorganosiloxane having the average unit formula:

wherein x and y are positive numbers, z is greater than or equal to zero, and at least one R' includes a free radical polymerizable group. In one embodiment, where the first radical polymerizable compound includes an organopolysiloxane, the first radical polymerizable compound has a linear, branched, hyperbranched, or resinous structure. The first radical polymerizable compound may also be homopolymeric or copolymeric. The first radical polymerizable compound may include at least one of an acrylate group and a methacrylate group. In one embodiment, the polyorganosiloxane is further defined as an acrylate- or methacrylate-functional polyorganosiloxane. In another embodiment, the polyorganosiloxane is further defined as monomethacryloxypropyl terminated polydimethylsiloxane.

The first radical polymerizable compound may also be further defined as a compound having at least one of the following formulae:

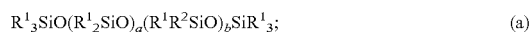 (a)

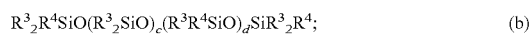 (b)

and

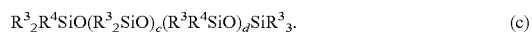 (c)

In Formula (a), a and b are integers and each typically has an average value of less than or equal to 20,000 and b typically has an average value of at least one. Also, $R^1$ typically includes a monovalent organic group. Suitable monovalent organic groups include, but are not limited to, acrylic functional groups such as acryloxymethyl, acryloxypropyl, methacryloxymethyl, and methacryloxypropyl groups, alkyl groups such as methyl, ethyl, propyl, and butyl groups, alkenyl groups such as vinyl, allyl, and butenyl groups, alkynyl groups such as ethynyl and propynyl groups, aromatic groups such as phenyl, tolyl, and xylyl groups, cyanoalkyl groups such as cyanoethyl and cyanopropyl groups, halogenated hydrocarbon groups such as 3,3,3-trifluoropropyl, 3-chloropropyl, dichlorophenyl, and 6,6,6,5,5,4,4,3,3-nonafluorohexyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, alkyloxypoly(oxyalkyene) groups such as propyloxy (polyoxyethylene), propyloxypoly(oxypropylene), and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups, alkoxy groups such as methoxy, ethoxy, n-propoxy, isopropoxy, n-butoxy, and ethylhexyloxy groups, aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, epoxyalkyl groups such as 3-glycidoxypropyl, 2-(3,4,epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3-propylisocyanurate, propyl-t-butylcarbamate, and propylethylcarbamate groups, aldehyde functional groups such as undecanal and butyraldehyde groups, anhydride functional groups such as 3-propyl succinic anhydride, 2-ethyl succinic anhydride, methyl succinic anhydride, 3-propyl maleic anhydride, 2-ethyl maleic anhydride, methyl maleic anhydride, carboxylic acid functional groups such as 11-carboxyundecyl, 3-carboxypropyl and 2-carboxyethyl groups, carbazole groups such as 3-(N,N-diphenylamino)phenyl-3-propyl, arylamino-functional groups such as 4-(N,N-diphenylamino)phenyl-3-propyl, and metal salts of carboxylic acids such as the zinc, sodium, and/or potassium salts of 3-carboxypropyl and 2-carboxyethyl groups, and combinations thereof. $R^2$ typically includes an unsaturated monovalent organic group. The unsaturated monovalent organic group may include, but is not limited to, alkenyl groups such as vinyl, allyl, and butenyl groups, alkynyl groups such as ethynyl and propynyl groups, and acrylic functional groups such as acryloxypropyl and methacryloxypropyl groups, and combinations thereof.

In Formulae (b) and (c), c and d are integers and each typically has an average value of less than or equal to 20,000. In this formula, each $R^3$ may independently be the same or may be different from $R^1$. Additionally, each $R^4$ may independently include an unsaturated organic group including, but not limited to alkenyl groups such as vinyl, allyl, and butenyl groups, alkynyl groups such as ethynyl and propynyl groups, alkenyloxypoly(oxyalkyene) groups such as allyloxy(polyoxyethylene), allyloxypoly(oxypropylene), and allyloxy-poly(oxypropylene)-co-poly(oxyethylene) groups, acrylic functional groups such as acryloxypropyl and methacryloxypropyl groups, and combinations thereof.

In one embodiment, the first radical polymerizable compound is an organopolysiloxane that is monofunctional relative to the radical polymerizable group. Useful examples include, but are not limited to, monofunctional acrylate or methacrylate terminated organopolysiloxanes including compounds such as polydimethylsiloxane terminated at a first end by a methacryloxypropyldimethylsilyl group and terminated at a second end by n-butyldimethylsilyl groups. In yet another embodiment, the first radical polymerizable compound may include, but is not limited to, 1,3-bis(methacryloxypropyl)tetramethyldisiloxane, 1,3-bis(acryloxypropyl)tetramethyldisiloxane, 1,3-bis(methacryloxymethyl)tetramethyldisiloxane, 1,3-bis(acryloxymethyl)tetramethyldisiloxane, α,ω-methacryloxymethyldimethylsilyl terminated polydimethylsiloxane, methacryloxypropyl-terminated polydimethylsiloxane, α,ω,-acryloxymethyldimethylsilyl terminated polydimethylsiloxane, methacryloxypropyldimethylsilyl terminated polydimethylsiloxane, α,ω-acryloxypropyldimethylsilyl terminated polydimethylsiloxane, pendant acrylate and methacrylate functional polymers such as poly(acryloxypropyl-methylsiloxy)polydimethylsiloxane and poly(methacryloxypropyl-methylsiloxy)polydimethylsiloxane copolymers, telechelic polydimethylsiloxanes having multiple acrylate or methacrylate functional groups.

Further, the first radical polymerizable compound may include organopolysiloxane resins having the following structures:

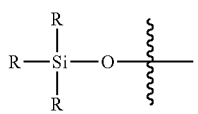
(M)

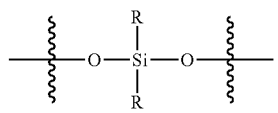
(D)

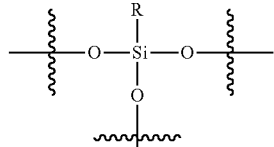
(T)

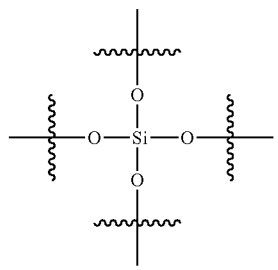
(Q)

wherein each of M, D, T, and Q independently represent functionality of structural groups of organopolysiloxanes. Specifically, M represents a monofunctional group $R_3SiO_{1/2}$. D represents a difunctional group $R_2SiO_{2/2}$. T represents a trifunctional group $RSiO_{3/2}$. Q represents a tetrafunctional group $SiO_{4/2}$.

If the first radical polymerizable compound includes an organopolysiloxane resin, the organopolysiloxane resin may include MQ resins including $R^5_3SiO_{1/2}$ groups and $SiO_{4/2}$ groups, TD resins including $R^5SiO_{3/2}$ groups and $R^5_2SiO_{2/2}$ groups, MT resins including $R^5_3SiO_{1/2}$ groups and $R^5SiO_{3/2}$ groups, MTD resins including $R^5_3SiO_{1/2}$ groups, $R^5SiO_{3/2}$ groups, and $R^5_2SiO_{2/2}$ groups, and combinations thereof.

In these resins, each $R^5$ may include a monovalent organic group. $R^5$ typically has from 1 to 20 and more typically has from 1 to 10, carbon atoms. Suitable examples of the monovalent organic groups include, but are not limited to, acrylate functional groups such as acryloxyalkyl groups, methacrylate functional groups such as methacryloxyalkyl groups, cyano-functional groups, and monovalent hydrocarbon groups, and combinations thereof. The monovalent hydrocarbon groups may include alkyl groups such as methyl, ethyl, propyl, pentyl, octyl, undecyl, and octadecyl groups, cycloalkyl groups such as cyclohexyl groups, alkenyl groups such as vinyl, allyl, butenyl, and hexenyl groups, alkynyl groups such as ethynyl, propynyl, and butynyl groups, aryl groups such as phenyl, tolyl, xylyl, benzyl, and 2-phenylethyl groups, halogenated hydrocarbon groups such as 3,3,3-trifluoropropyl, 3-chloropropyl, dichlorophenyl, and 6,6,6,5,5,4,4,3,3-nonafluorohexyl groups, and combinations thereof. The cyano-functional groups may include cyanoalkyl groups such as cyanoethyl and cyanopropyl groups.

$R^5$ may also include alkyloxypoly(oxyalkyene) groups such as propyloxy(polyoxyethylene), propyloxypoly(oxypropylene) and propyloxy-poly(oxypropylene)-co-poly(oxyethylene) groups, halogen substituted alkyloxypoly(oxyalkyene) groups such as perfluoropropyloxy(polyoxyethylene), perfluoropropyloxypoly(oxypropylene) and perfluoropropyloxy-poly(oxypropylene) copoly(oxyethylene) groups, alkenyloxypoly(oxyalkyene) groups such as allyloxypoly(oxyethylene), allyloxypoly(oxypropylene) and allyloxy-poly(oxypropylene) copoly(oxyethylene) groups, alkoxy groups such as methoxy, ethoxy, n-propoxy, isopropoxy, n-butoxy and ethylhexyloxy groups, aminoalkyl groups such as 3-aminohexyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups, hindered aminoalkyl groups such as tetramethylpiperidinyl oxypropyl groups, epoxyalkyl groups such as 3-glycidoxypropyl, 2-(3,4,-epoxycyclohexyl)ethyl, and 5,6-epoxyhexyl groups, ester functional groups such as acetoxymethyl and benzoyloxypropyl groups, hydroxyl functional groups such as hydroxy and 2-hydroxyethyl groups, isocyanate and masked isocyanate functional groups such as 3-isocyanatopropyl, tris-3propyl-isocyanurate, propyl-t-butylcarbamate, and propylethylcarbamate groups, aldehyde functional groups such as undecanal and butyraldehyde groups, anhydride functional groups such as 3-propyl succinic anhydride and 3-propyl maleic anhydride groups, carboxylic acid functional groups such as 3-carboxypropyl, 2-carboxyethyl, and 10-carboxydecyl groups, metal salts of carboxylic acids such as zinc, sodium, and potassium salts of 3-carboxypropyl and 2-carboxyethyl groups.

Some specific examples of suitable resins that are useful include, but are not limited to, $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, and combinations thereof, where M, D, T, and Q are the same as described above. The organopolysiloxane resins may be prepared by any method known in the art.

The organopolysiloxane resins may be prepared by any method known in the art such as by treating a resin copolymer produced by a silica hydrosol capping process with an alkenyl including endblocking reagent. This method may include reacting a silica hydrosol under acidic conditions with a hydrolyzable triorganosilane such as trimethylchlorosilane, a siloxane such as hexamethyldisiloxane, and combinations thereof, and then recovering a copolymer having M and Q groups including 2 to 5 percent by weight of hydroxyl groups. This copolymer may be reacted with an endblocking agent including unsaturated organic groups and an endblocking agent free of aliphatic unsaturation in amounts sufficient to provide 3 to 30 mole percent of unsaturated organic groups in the resin. Suitable endblocking agents include silazanes, siloxanes, silanes, and combinations thereof.

The first radical polymerizable compound may include a physical transition temperature, include an organofunctional group with a physical transition temperature or, upon polymerization, form an organopolysiloxane matrix that has a physical transition temperature, i.e., glass transition or melting transition, such that the first radical polymerizable compound undergoes changes marked by softening or non-linear reduction in viscosity on reaching certain temperatures under conditions of use. Organopolysiloxane matrices are useful for phase change compositions such as those found to be useful in thermally conductive phase change thermal interface materials for electronic components. A suitable organopolysiloxane matrix includes an organofunctional silicone wax which may be an uncross-linked organofunctional silicone wax, a cross-linked organofunctional silicone wax, or combinations thereof. Organofunctional silicone waxes including at least one free radical polymerizable group such as acrylate or methacrylate are useful to impart phase changes to the non-random copolymer.

Referring back, the second radical polymerizable compound is different from the first radical polymerizable compound but may be any of the compounds described above relative to the first radical polymerizable compound. In one embodiment, the first and second radical polymerizable compounds are different from each other and each is independently selected from the group of an organosilane and an organopolysiloxane. In another embodiment, one of the first and second radical polymerizable compounds is further defined as a polyorganosiloxane having the average unit formula:

$$(R'_3SiO_{1/2})_x(R'_2SiO_{2/2})_y(R'SiO_{3/2})_z$$

wherein x and y are positive numbers, z is greater than or equal to zero, and at least one R' is a free radical polymerizable group, and the other of the first and second radical polymerizable compounds is further defined as an organosilane having the general structure:

$$R_nSi(OR')_{4-n}$$

wherein n is an integer of less than or equal to 4, and wherein at least one of R and R' independently comprises a free radical polymerizable group. In an alternative embodiment, both of the first and second radical polymerizable compounds are further defined as polyorganosiloxanes as described immediately above.

It is also contemplated that one of the first and second radical polymerizable compounds may be selected from the group of an organosilane, an organopolysiloxane, and combinations thereof and the other of the first and second radical polymerizable compounds is organic and free of silicon atoms. In one embodiment, one of the first and second radical polymerizable compounds is further defined as a polyorganosiloxane, as set forth above and the other of the first and second radical polymerizable compounds is selected from the group of acrylates, alkenoates, carbonates, phthalates, acetates, itaconates, and combinations thereof. Further, in this embodiment, the polyorganodisiloxane is an organopolysiloxane monofunctional in the radical polymerizable group. Also in this embodiment, the other of the first and second radical polymerizable compounds may be further defined as an acrylate, such as methylmethacrylate, or those described in detail above.

In another embodiment, one of the first and second radical polymerizable compounds is further defined as an organosilane as described above and the other is selected from the group of acrylates, alkenoates, carbonates, phthalates, acetates, itaconates, and combinations thereof. In this embodiment, the other of the first and second radical polymerizable compounds may be further defined as an acrylate, such as methylmethacrylate, or those described in detail above.

Alternatively, the first and second radical polymerizable compounds may each be organic and free of silicon atoms. In one embodiment, each of the first and second radical polymerizable compound is independently selected from the group of acrylates, alkenoates, carbonates, phthalates, acetates, and itaconates. In an alternative embodiment, both the first and second radical polymerizable compounds may be further defined as acrylates such as those described in detail above.

Further, both the first and second radical polymerizable compounds may be organic and free of silicon atoms while one of the first and second radical polymerizable compounds is further defined as an organic macromonomer that is free of silicon atoms. In this embodiment, the other of the first and second radical polymerizable compounds is selected from the group of an organosilane, an organopolysiloxane, and combinations thereof. In addition, one of the first and second radical polymerizable compounds may be selected from the group of an organosilane, an organopolysiloxane, and combinations thereof, further defined as an organopolysiloxanes, or further defined as an organosilane, and the other of the first and second radical polymerizable compounds is further defined as an organic macromonomer that is free of silicon atoms.

It is also contemplated that mixtures of monomers, dimers, oligomers, pre-polymers, polymers, co-polymers, and/or macromonomers may be used to impart a desired combination of physical properties to the non-random copolymer such as viscosity, volatility, substrate wetting for processability and resolution in an uncured state, $T_g$, polydispersity index, hardness or solubility, and surface properties such as hydrophilicity or hydrophobicity in a cured state. It is still further contemplated that the first and second radical polymerizable compounds may be other than organic or silicon containing and remain suitable for use in this invention so long as the compounds can be radically polymerized.

Referring back, the first radical polymerizable compound and the second radical polymerizable compound are polymerized in the presence of an organoborane initiator and an organoborane decomplexing agent. The organoborane initiator may be any organoborane known in the art capable of generating free radicals. Although any organoborane may be used, the organoborane initiator typically includes tri-functional boranes which include the general structure:

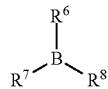

wherein each of $R^6$-$R^8$ independently has from 1 to 20 carbon atoms and wherein each of $R^6$-$R^8$ independently comprise one of a hydrogen atom, an aliphatic hydrocarbon group and an aromatic hydrocarbon group. Up to two of the $R^6$-$R^8$ may also independently be an alkoxy group such as a methoxy or ethoxy group such that at least one of $R^6$-$R^8$ provides a boron-carbon bond. The aliphatic and/or aromatic hydrocarbon groups may be linear, branched, and/or cyclic. Suitable examples of the organoborane include, but are not limited to, tri-methylborane, tri-ethylborane, tri-n-butylborane, tri-n-octylborane, tri-sec-butylborane, tri-dodecylborane, phenyldiethylborane, and combinations thereof. Most typically, the organoborane initiator includes tri-ethylborane or tri-n-butylborane.

It is also contemplated that the organoborane initiator may be organosilicon functional and may include a functional group including at least one of a silicon atom, a siloxane oligomer, and a siloxane polymer. Particularly useful organosilicon functional organoborane initiators are described in PCT/US05/044947, entitled "Organosilicon Functional Boron Amine Catalyst Complexes and Curable Compositions Made Therefrom", the disclosure of which, as related to the organosilicon functional organoborane initiators, is herein expressly incorporated by reference.

Typically, the organoborane initiator is derived from decomplexation of an air-stable complex of an organoborane and an organonitrogen compound. In one embodiment, the organoborane initiator is further defined as an organoborane-organonitrogen complex. Suitable organoborane initiators include, but are not limited to, organoborane-amine complexes, organoborane-azole complexes, organoborane-amidine complexes, organoborane-heterocyclic nitrogen complexes, amido-organoborate complexes, and combinations thereof. Additional suitable organoborane initiators are described in U.S. Pat. App. Pub. No. 2007/0141267, U.S. Pat. No. 7,247,596, and W.O. Pat. App. Pub. No. 2007044735, expressly incorporated herein by reference relative to the organoborane initiators. Most typically, the organoborane initiator is further defined as an organoborane-amine complex. A typical organoborane-amine complex includes a complex formed between an organoborane and a suitable amine that renders the organoborane-amine complex stable at ambient conditions. Any organoborane-amine complex known in the art may be used. Typically, the organoborane-amine complex is capable of initiating polymerization or cross-linking of a radical polymerizable compound through introduction of an organoborane decomplexing agent, described in detail below, and/or by heating. That is, the organoborane-amine complex may be destabilized at ambient temperatures through exposure to suitable organoborane decomplexing agents. Heat may be applied if needed or desired. The organoborane-amine complex typically has the formula:

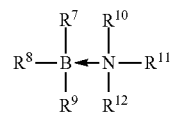

wherein B represents boron. Additionally, each of $R^7$, $R^8$, and $R^9$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^7$, $R^8$, and $R^9$ includes one or more silicon atoms, and is covalently bonded to boron. Further, each of $R^{10}$, $R^{11}$, and $R^{12}$ typically yields an amine compound or a polyamine compound capable of complexing the boron. Two or more of $R^7$, $R^8$, and $R^9$ and two or more of $R^{10}$, $R^{11}$, and $R^{12}$ may combine to form heterocyclic structures, provided a sum of the number of atoms from $R^7$, $R^8$, $R^9$, $R^{10}$, $R^{11}$, and $R^{12}$ does not exceed 11.

Additionally, any amine known in the art may be used to form the organoborane-amine complex. Typically, the amine includes at least one of an alkyl group, an alkoxy group, an imidazole group, an amidine group, an ureido group, and combinations thereof. Particularly suitable amines include, but are not limited to, 1,3 propane diamine, 1,6-hexanediamine, methoxypropylamine, pyridine, isophorone diamine, 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxy)silane, t-4-(2-aminoethyl)-3-aminopropyltrimethoxysilane, N1-(6-aminohexyl)aminomethyltrimethoxysilane, N-(2-aminoethyl)-11 aminoundecyltrimethoxysilane, aminoethylaminomethylphenethyltrimethoxysilane, N-(2-aminoethyl)-3-aminopropylmethyldimethoxysilane, N-(2-aminoethyl)-3- aminoisobutylmethyldimethoxysilane, (3-trimethoxysilylpropyl)diethylene-triamine, 1,1,2,4-tetramethyl-1-sila-2-azacyclopentane, amine functional organopolysiloxanes including at least one amine functional group such as 3-aminopropyl, 6-aminohexyl, 11-aminoundecyl, 3-(N-allylamino)propyl, N-(2-aminoethyl)-3-aminopropyl, aminomethyl, N-(2-aminoethyl)-3-aminoisobutyl, p-aminophenyl, 2-ethylpyridine, and 3-propylpyrrole, nitrogen compounds including N-(3-triethyoxysilylpropyl)-4,5-dihydroimidazole, ureidopropyltriethoxysilane, and combinations thereof. In one embodiment, the amine is selected from the group of amine-functional silanes, amine-functional organopolysiloxanes, and combinations thereof. In another embodiment, the amine includes N-(2-aminoethyl)-3-aminopropyltrimethoxysilane.

The organoborane initiator may be physically and/or chemically attached (bound) to a solid particle such as a phase support to control working times, as well as to stabilize liquid phase organoborane-amine complexes against separating during storage. Attachment can be accomplished by a number of known surface treatments either in-situ or a priori. Some surface treatment methods include pre-treating solid particles such as ground or precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, base metals such as nickel, aluminum, copper, and steel, and combinations thereof, with a condensation reactive compound. Some examples of condensation reactive compounds that may be used include, but are not limited to, isocyanatopropyltriethoxysilane, isocyanatomethyltriethoxysilane, triethoxysilylundecanal, glycidoxypropyltrimethoxysilane, glycidoxymethyltrimethoxysilane, 3-(triethoxysilyl)propylsuccinic anhydride, 2-(4-chlorosulfonylphenyl)ethyltrimethoxysilane, and combinations thereof. The pretreatment may be followed by complexation with the organoborane, or by direct treatment of the solid particles using a preformed organoborane initiator that is condensation reactive. If the solid particles include surface functional groups, additives such as surface treating agents or impurities that are inherently amine-reactive, may require appropriate pre-cautions to avoid premature decomplexation of the organoborane initiator being attached. Solid particles including amine-reactive substances can be purified or neutralized before attachment of the organoborane initiator. Alternatively, the attachment of the organoborane initiator may be performed in an oxygen free environment.

The organoborane initiator may be used in any amount to form the non-random copolymer. Typically, the organoborane initiator is used in an amount of from 0.1 to 25, more typically of from 0.5 to 20, and most typically of from 1 to 10 parts by weight per 100 parts by weight of the first radical polymerizable compound, the second radical polymerizable compound, the organoborane initiator, and the organoborane decomplexing agent. The amounts of the organoborane initiator used in this invention depend upon a molecular weight and functionality of the organoborane initiator and the presence of other components such as fillers. Typically, a concentration of boron in the organoborane initiator is between 10 and 100,000, more typically between 100 and 10,000, and most typically between 200 and 5,000, parts by weight per one million parts by weight (ppm) of radical polymerizable compounds that react to form the non-random copolymer.

Referring back, the organoborane decomplexing agent may be any known in the art and may be delivered as a gas, liquid, or solid. In one embodiment, the organoborane initiator interacts with the organoborane decomplexing agent to initiate polymerization and/or cross-linking of the first and second radical polymerizable compounds. Typically this occurs when the organoborane decomplexing agent is mixed with the organoborane initiator and exposed to an oxygenated environment, such as air, at temperatures below a dissociation temperature of the organoborane initiator, including room temperature and below. Without intending to be limited by any particular theory, it is believed that the organoborane decomplexing agent sequesters a portion of the organoborane initiator and allows the organoborane to act as a free radical initiator and initiate polymerization of the first and/or second radical polymerizable compounds.

In one embodiment, the organoborane decomplexing agent and/or a combination of organoborane decomplexing agents includes free radical polymerizable groups and is substantially free of silicon. In an alternative embodiment, the organoborane decomplexing agent and/or combination consists essentially of free radical polymerizable groups that are substantially free of silicon and do not include any silicon compounds that materially affect the basic and novel characteristics of the non-random copolymer. Further, the organoborane decomplexing agent and/or combination may consist of free radical polymerizable groups that are substantially free of silicon. It is to be understood that the terminology "substantially free" refers to a concentration of silicon of less than 5,000, more typically of less than 900, and most typically of less than 100, parts of compounds that include silicon, per one million parts of the non-random copolymer. Alternatively, the organoborane decomplexing agent and/or combination may be completely free of silicon. The organoborane decomplexing agent may be selected from the group of an acid, an anhydride, and combinations thereof.

In one embodiment, the organoborane decomplexing agent includes free radical polymerizable groups or other functional groups such as a hydrolyzable group, and can be monomeric, dimeric, oligomeric or polymeric. Examples of an organoborane decomplexing agent that include free radical polymerizable groups are acrylic acid, methacrylic acid, 2-carboxyethyl acrylate, 2-carboxyethyl methacrylate, and combinations thereof. In one embodiment, the organoborane decomplexing agent is selected from the group of acrylic acid, methacrylic acid, and combinations thereof. In this embodiment, the decomplexing agent can served as one of the radical polymerizable compounds or may be used in a sufficiently small quantity to avoid free radical polymerization and instead function to decomplex the organoborane initiator without detrimentally affecting properties of the non-random copolymer.

Alternatively, the organoborane decomplexing agent may be selected from the group of acids such as acetic acid, acrylic acid, methacrylic acid, and/or any of the strong acids known in the art, acid halides such as acid chlorides, inorganic acids such as HCl, sulfuric acid, alkyl or aryl sulfonic acid, transition metal cations, strong alkylating agents such as methyl iodide, and combinations thereof. In one embodiment, the organoborane decomplexing agent is acetic acid. In another embodiment, the organoborane decomplexing agent is selected from the group of mineral acids, organic acids, Lewis acids, isocyanates, acid chlorides, sulphonyl chlorides, aldehydes, and combinations thereof. Additional non-limiting examples of suitable organoborane decomplexing agents include $SnCl_4$, $TiCl_4$, mono- and/or poly-carboxylic acids, HCl, $H_2SO4$, $H_3PO_4$, phosphonic acid, phosphinic acid, silicic acid, mono- and/or poly-carboxylic acid esters, cyclocarbonates, aldehydes such as terephthaloyl dicarbaxaldehyde, and combinations thereof.

The organoborane decomplexing agent may include amine-reactive compounds that include amine-reactive groups that may be attached to an organic compound, an organosilicon compound, an organosilane, or an organopolysiloxane. The organoborane decomplexing agent may be derived from the organoborane-amine complex and/or any additives present and may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof. Alternatively, the organoborane decomplexing agent may be selected from the group of isophorone diisocyanate, hexamethylenediisocyanate, toluenediisocyanate, methyldiphenyldiisocyanate, acrylic acid, methacrylic anhydride, undecylenic acid, citraconic anhydride, itaconic acid, itaconic anhydride, polyacrylic acid, and combinations thereof. The organoborane decomplexing agent may be selected from the group of organic compounds, silanes and organosiloxanes, and combinations thereof, and may be monomeric, oligomeric, and/or polymeric. The organic compounds, silanes, and/or organosiloxanes may include at least one of an isocyanate functional group, a carboxylic acid functional group, and an anhydride functional group. The organoborane decomplexing agent may include, but is not limited to, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, an amine-reactive organosilane, an organopolysiloxane including 3-isocyanatopropyltrimethoxysilane, isocyanatomethyltrimethoxysilane, 3-glycidoxypropyltrimethoxysilane, a methylsuccinic anhydride- and propylsuccinic anhydride-functionalized linear, branched, resinous, and/or hyperbranched organopolysiloxane, a cyclohexenyl anhydride-functionalized linear, resinous, and/or hyperbranched organopolysiloxane, a carboxylic acid-functionalized linear, branched, resinous, and/or hyperbranched organopolysiloxane such as a carboxydecyl terminated oligomeric or polymeric polydimethylsiloxane, an aldehyde-functionalized linear, branched, resinous, and/or hyperbranched organopolysiloxane such as a undecylenic aldehyde-terminated oligomeric or polymeric polydimethylsiloxane, and combinations thereof. Other compounds that can be used include compounds capable of generating amine-reactive groups when exposed to ultraviolet radiation such as photoacid generators and iodonium salts including [SbF$_6$]– counter ions and photosensitizing compounds such as isopropylthioxanthone. The organoborane decomplexing agent may be physically and/or chemically bound to a solid phase continuous or discrete support such as various types of solid particles described above, to control working times or to stabilize a liquid phase.

The organoborane decomplexing agent may be used in an amount equivalent to of from 0.5 to 50, more typically of from 0.1 to 30, and most typically of from 2.5 to 20, parts by weight per 100 parts by weight of the first radical polymerizable compound, the second radical polymerizable compound, the organoborane initiator, and the organoborane decomplexing agent. The amount of the organoborane decomplexing agent may depend upon its molecular weight and functionality and the presence of other components such as fillers. In another embodiment, the organoborane decomplexing agent includes amine-reactive groups and is typically used in an amount wherein a molar ratio of amine-reactive groups to amine groups in the organoborane decomplexing agent and organoborane initiator is of from 0.1 to 100, more typically from 0.5 to 50, even more typically of from 0.8 to 20, and most typically from 1 to 10.

The first and second radical polymerizable compounds may be polymerized in any suitable reaction vessel known in the art including, but not limited to, both laboratory and industrial scale mixing vessels, reactors (10), both pressurized and non-pressurized, and the like. The vessels (e.g. reactors) may be of any shape and size. In one embodiment, the reactor has a height that is greater than twice a width, as set forth in FIG. 3. In another embodiment, the reactor has a width that is greater than twice its height, as set forth in FIG. 4. In an alternative embodiment, the reactor has a width and height that are approximately the same, as set forth in FIG. 5. The size and shape of the vessel affects the "effective size" of the reactor, as described in greater detail below, and also affects a local molar excess of one of the first or second radical polymerizable compounds to the other.

The non-random copolymer may further be combined with an additive. Although any additive known in the art may be used, the additive is typically selected from the group of an amine additive different from an organoborane-amine complex used as the organoborane initiator, a gas generating component, an adhesion promoter, an extending polymer, a softening polymer, a reinforcing polymer, a toughening polymer, a viscosity modifier, a volatility modifier, an extending filler, a reinforcing filler, a conductive filler, a spacer, a dye, a pigment, a co-monomer, a UV light absorber, a hindered amine light stabilizer, an aziridine stabilizer, a void reducing agent, a cure modifier, a free radical initiator other than the organoborane initiator, a diluent, a rheology modifier, an acid acceptor, an antioxidant, a heat stabilizer, a flame retardant, a corrosion inhibitor, a silylating agent, a foam stabilizer, a surfactant, a wetting agent, a solvent, a plasticizer, a fluxing agent, a desiccant, a chain transfer agent, a radical scavenger, and combinations thereof. In another embodiment, the additive includes at least one of the extending, reinforcing, and conductive fillers. In this embodiment, the filler may be pretreated with lubricants. If the non-random copolymer includes the additive, the additive is typically present in an amount of from 0.0001 to 95, more typically of from 0.001 to 90, and most typically of from 0.01 to 88, parts by weight per 100 parts by weight of the first and second radical polymerizable compounds, the organoborane initiator, and the organoborane decomplexing agent.

As first introduced above, the instant invention provides a method of forming the non-random copolymer. The method includes the step of combining a mixture of the first radical polymerizable compound and the organoborane initiator, the second radical polymerizable compound, and the decomplexing agent at a rate sufficient to form the non-random copolymer. This step may be further defined as continuous, semi-continuous, or batch. In addition, the first radical polymerizable compound and the organoborane initiator may be combined before addition to the second radical polymerizable compound or while each is added to the second radical polymerizable compound.

The step of combining may be further defined as adding the mixture of the first radical curable compound and the organoborane initiator to the second radical polymerizable compound in the absence of the organoborane decomplexing agent. In other words, the mixture of the first radical curable compound and the organoborane initiator may be added to the second radical polymerizable compound independently from the organoborane decomplexing agent. In an alternative embodiment, the mixture of the first radical curable compound and the organoborane initiator is added to the second radical polymerizable compound and the organoborane decomplexing agent simultaneously. The second radical polymerizable compound and the organoborane decomplexing agent may be combined in a second mixture to which the (first) mixture of the first radical curable compound and the organoborane initiator is added. The second radical polymerizable compound and the organoborane decomplexing agent may be combined before, during, or after addition of the mixture of the first radical polymerizable compound and the organoborane initiator to the second radical polymerizable compound. Further, the step of combining the second radical polymerizable compound and the organoborane decomplexing agent may be further defined as continuous, semi-continuous, or batch.

Alternatively, the step of combining may be further defined as adding the second radical polymerizable compound to the mixture of the first radical curable compound and the organoborane initiator. In one embodiment, the second radical polymerizable compound and the organoborane decomplexing are added to the mixture of the first radical curable compound and the organoborane initiator simultaneously. In another embodiment, the second radical polymerizable compound is added to the mixture of the first radical curable compound and the organoborane initiator and then the organoborane decomplexing agent is added to the mixture. The aforementioned steps of adding the second radical polymerizable compound and/or the organoborane decomplexing agent to the first radical polymerizable compound and the organoborane initiator may each be independently further defined as continuous, semi-continuous, or batch.

It is contemplated that the step of combining may be further defined as adding droplets (12) of the mixture of the first radical curable compound and the organoborane initiator to the second radical polymerizable compound (14) and/or organoborane decomplexing agent, or vice versa, as illustrated in FIGS. 3-6. It is also contemplated that the step of adding the droplets (12) may be further defined as spraying and/or misting.

Figure 3:
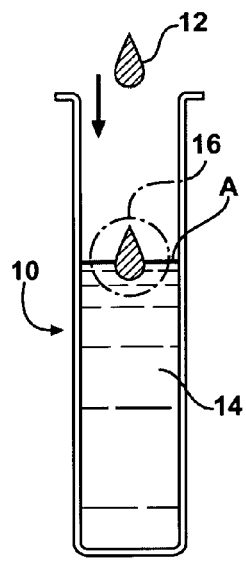
FIG. 3 is a cross-sectional view of a first reactor having an approximate height that is more than twice an approximate width and generally illustrates a cross-sectional area of an effective reaction volume of the reactor that is smaller than an actual cross-sectional surface area of the reactor.
Figure 4:
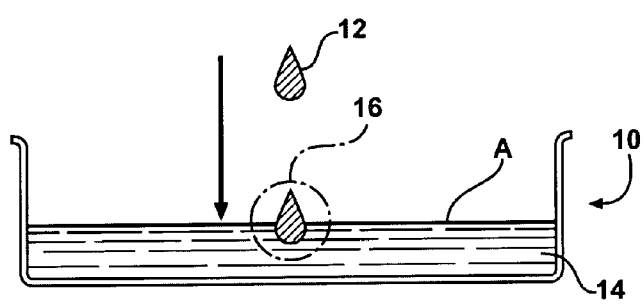
FIG. 4 is a cross-sectional view of a second reactor having an approximate width that is more than twice an approximate height and generally illustrates a cross-sectional area of an effective reaction volume of the reactor that is smaller than an actual cross-sectional surface area of the reactor.
Figure 5:
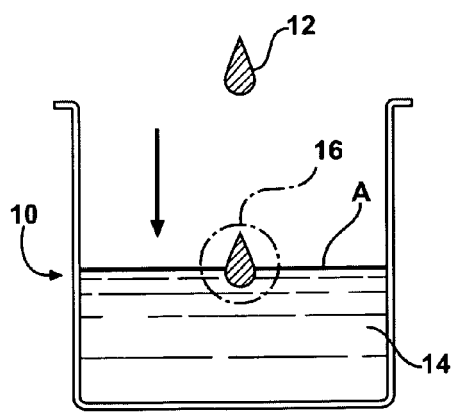
FIG. 5 is a cross-sectional view of a third reactor having a height and width that are approximately the same and generally illustrates a cross-sectional area of an effective reaction volume of the reactor that is smaller than an actual cross-sectional surface area of the reactor.
Figure 6:
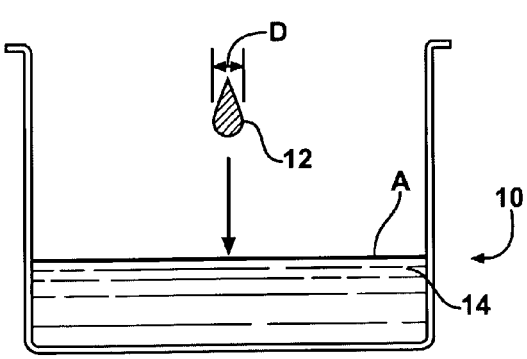
FIG. 6 is a cross-sectional view of a reactor generally illustrating effective reaction volume, diameter of a droplet of the first and/or second radical polymerizable compounds that is introduced into the reactor, actual cross-sectional surface area of the reactor, and volume of the reactor.

As first introduced above, the mixture of the first radical curable compound and the organoborane initiator is combined with the second radical polymerizable compound and the organoborane decomplexing agent at a rate (e.g. a flow rate) sufficient to form the non-random copolymer. Without intending to be bound by any particular theory, it is believed that within the reactor (10) exists an "effective reaction volume" (16) where the first and second radical polymerizable compounds actually polymerize, which influences the formation of the non-random copolymer. More specifically, as illustrated in FIGS. 3-5, a cross-sectional area of the effective reaction volume (16) is typically smaller than an actual cross-sectional surface area (A) of the reactor (10) because of speed and location in which organoborane initiated polymerization occurs relative to typical rates of mixing within the reactor (10). In addition, the effective reaction volume (16) is typically governed by a length scale (e.g. diameter) (D) of a droplet (12) of the first and/or second radical polymerizable compounds that is introduced into the reactor (10). The effective reaction volume (16) is believed to influence a local molar excess of one of the first or second radical polymerizable compounds to the other within the effective reaction volume (16), favoring formation of the non-random copolymer. Without intending to be bound by any particular theory, it is believed that this local molar excess contributes to the formation of the non-random copolymers of this invention.

Referring back, the rate of combining the mixture of the first radical polymerizable compound and the organoborane initiator, and the second radical polymerizable compound may be based on one of the following formulae:

$$\frac{\text{Moles of the first radical polymerizable compound/min}}{\text{Moles of the second radical polymerizable compound}} \quad (I)$$

or $$\frac{\text{Moles of the second radical polymerizable compound/min}}{\text{Moles of the first radical polymerizable compound}} \quad (II)$$

In one embodiment, the non-random copolymer is further defined as a block copolymer having first and second glass transition temperatures that each has breadths of less than 25° C. (as defined above) and the step of combining is further defined as adding the mixture of the first radical polymerizable compound and the organoborane initiator to the second radical polymerizable compound at a rate of from 0.001 to 0.0043 moles of the first radical polymerizable compound per minute per mole of the second radical polymerizable compound, according to Formula (I) above. It is contemplated that in this embodiment, the second radical polymerizable compound may be combined with the decomplexing agent.

In an alternative embodiment, the non-random copolymer is further defined as a gradient copolymer having at least one glass transition temperature that has a breadth of at least 25° C. and the step of combining is further defined as adding the mixture of the first radical polymerizable compound and the organoborane initiator to the second radical polymerizable compound at a rate of from greater than 0.0043 to 0.015 moles of the first radical polymerizable compound per minute per mole of the second radical polymerizable compound, according to Formula (I) above. It is also contemplated that in this embodiment, the second radical polymerizable compound may be combined with the decomplexing agent.

In a further embodiment, the non-random copolymer is further defined as a block copolymer having first and second glass transition temperatures that each has breadths of less than 25° C. and the step of combining is further defined as adding the second radical polymerizable compound to the mixture of the first radical polymerizable compound and the organoborane initiator at a rate of from 0.001 to 0.0043 moles of the second radical polymerizable compound per minute per mole of the first radical polymerizable compound, according to Formula (II) above. It is contemplated that in this embodiment, the second radical polymerizable compound may be combined with the decomplexing agent.

In still a further embodiment, the non-random copolymer is further defined as a gradient copolymer having at least one glass transition temperature that has a breadth of at least 25° C. and the step of combining is further defined as adding the second radical polymerizable compound to the mixture of the first radical polymerizable compound and the organoborane initiator at a rate of from greater than 0.0043 to 0.015 moles of the second radical polymerizable compound per minute per mole of the first radical polymerizable compound, according to Formula (II) above. It is also contemplated that in this embodiment, the second radical polymerizable compound may be combined with the decomplexing agent.

Typically, the step of combining includes the step of reacting (i.e., polymerizing) the first and second radical polymerizable compounds. Most typically, and as first introduced above, the step of polymerizing occurs via free radical polymerization initiated by the organoborane initiator. In various embodiments, the first and second radical polymerizable compound are polymerized at temperatures of from −77° C. to 300° C., from −40° C. to 300° C., from 0° C. to 100° C., from 0° C. to 80° C., 15° C. to 35° C., and 40° C. to 80° C. In one embodiment, the first and second radical polymerizable compounds are polymerized at room temperature (~22° C.±3° C.). Of course, the instant invention is not limited to polymerization at these temperatures. The temperature of polymerization may be higher or lower than these temperatures. In addition, the first and second radical polymerizable compounds may be polymerized (e.g. cured) for a time of from 5 seconds to 24 hours and more typically of from 30 seconds to 2 hours. However, these times are non-limiting and the first and second radical polymerizable compounds may be polymerized in any amount of time.

The method may also include the step of adding a solvent to the mixture of the first radical curable compound and the organoborane, to the second radical curable compound, and/ or to the organoborane decomplexing agent. The method may include the step of adding solvent to the mixture of the first radical curable compound and the organoborane such that the mixture typically has a molarity of from 0.0001 to 20, more typically of from 0.001 to 15, and most typically of from 0.005 to 10, moles, of the first polymerizable compound per liter of the mixture. The method may also include the step of adding solvent to the second radical polymerizable compound to form a second mixture that typically has a molarity of from 0.0001 to 20, more typically of from 0.001 to 15, and most typically of from 0.005 to 10, moles, of the second polymerizable compound per liter of the second mixture. Of course, it is to be understood that the first and second mixtures are not limited to the molarities described above and may have different molarities as compared to each other.

The solvent may be any organic or inorganic solvent known in the art. The solvent is typically aprotic. However, the invention is not limited to aprotic solvents. In one embodiment, the solvent is a dipolar aprotic solvent such as ethyl acetate and acetone. Other suitable solvents include, but are not limited to, acetonitrile, dimethyl sulfoxide, hexamethylphosphoramide, water, THF, methylene chloride, cyclohexane, linear and cyclic siloxanes, supercritical fluids, ionic liquids, and combinations thereof.

The following examples, illustrating the method and non-random copolymers of the present invention, are intended to illustrate and not to limit the invention.

EXAMPLES

Non-random copolymers, e.g. gradient and block copolymers, are formed according to the instant invention. In addition, a series of comparative random copolymers are also formed but do not represent this invention. Each of the non-random and comparative random copolymers are then evaluated to determine Glass Transition Temperature ($T_g$), Number Average Molecular Weight ($M_n$), and Polydispersity index (PDI).

Formation of Non-random Copolymers:

Four non-random copolymers (Non-Random Copolymers 1-4) are formed according to the present invention. After formation, each of the Non-Random Copolymers 1-4 is evaluated to determine Glass Transition Temperature ($T_g$), Number Average Molecular Weight ($M_n$), and Polydispersity index (PDI), using DSC with a heating ramp rate of 10° C./min according to ASTM E1356 as described above, and gel permeation chromatography.

Formation of Non-random Copolymer 1:

Non-Random Copolymer 1 is formed by adding 10 grams of monomethacryloxypropyl terminated polydimethylsiloxane as a first radical polymerizable compound, 2.5 grams of triethylborane-propane diamine as an organoborane initiator, and 10 grams of ethyl acetate as a solvent, to a jar to form a mixture. The mixture is thoroughly mixed and loaded into a syringe. In addition, 10 grams of methylmethacrylate as a second radical polymerizable compound, and 2.5 grams of acetic acid as an organoborane decomplexing agent, are added to a second jar. The methylmethacrylate and acetic acid is thoroughly mixed and stirred with a magnetic stir bar at 500 RPM. The mixture is then added dropwise at a rate of 0.5 mL/min to the methylmethacrylate and acetic acid being stirred at room temperature. This corresponds to a rate of addition of approximately 0.00215 moles of monomethacryloxypropyl terminated polydimethylsiloxane per minute added to one mole of methylmethacrylate, calculated using formula I above. The monomethacryloxypropyl terminated polydimethylsiloxane and the methylmethacrylate are allowed to react (i.e., polymerize), for 34 minutes to form the Block Copolymer 1. After 34 minutes, an amount of the Non-Random Copolymer 1 is precipitated in methanol followed by one cycle of dissolution/precipitations with heptane/methanol. Subsequently, the Non-Random Copolymer 1 is evaluated to determine $T_g$, $M_n$, and PDI using DSC with a heating ramp rate of 10° C./min according to ASTM E1356 as described above and using gel permeation chromatography. The results of the DSC of Non-Random Copolymer 1 are set forth in FIG. 7. In addition, the $T_g$, $M_n$, and PDI are set forth in Table 1 below wherein all amounts are in grams unless otherwise indicated.

Formation of Non-random Copolymer 2:

Non-Random Copolymer 2 is formed in the same way and with the same reactants as Non-Random Copolymer 1 except that the mixture is added dropwise at a rate of 1.0 mL/min to the methylmethacrylate and acetic acid being stirred at room temperature. This corresponds to a rate of addition of approximately 0.00430 moles of monomethacryloxypropyl terminated polydimethylsiloxane per minute added to one mole of methylmethacrylate, calculated using formula I above. After formation, the Non-Random Copolymer 2 is evaluated to determine $T_g$, $M_n$, and PDI using DSC with a heating ramp rate of 10° C./min according to ASTM as described above and using gel permeation chromatography. The results of the DSC of Non-Random Copolymer 2 are set forth in FIG. 8. In addition, the $T_g$, $M_n$, and PDI are set forth in Table 1 below wherein all amounts are in grams unless otherwise indicated Formation of Non-random Copolymer 3:

Non-Random Copolymer 3 is formed by adding 20 grams of monomethacryloxypropyl terminated polydimethylsiloxane as a first radical polymerizable compound, 5 grams of triethylborane-propane diamine as an organoborane initiator, and 20 grams of ethyl acetate as a solvent, to a jar to form a mixture. The mixture is thoroughly mixed and loaded into a syringe. In addition, 20 grams of methylmethacrylate as a second radical polymerizable compound, and 7 grams of acetic acid as an organoborane decomplexing agent, are added to a second jar. The methylmethacrylate and acetic acid is thoroughly mixed and stirred with a magnetic stir bar at 500 RPM. The mixture is then added dropwise at a rate of 2.0 mL/min to the methylmethacrylate and acetic acid being stirred at room temperature. This corresponds to a rate of addition of approximately 0.00430 moles of monomethacryloxypropyl terminated polydimethylsiloxane per minute added to one mole of methylmethacrylate, calculated using formula I above. The monomethacryloxypropyl terminated polydimethylsiloxane and the methylmethacrylate are allowed to react (i.e., polymerize), for 34 minutes to form the Non-Random Copolymer 3. After 34 minutes, an amount of the Non-Random Copolymer 3 is precipitated in methanol followed by one cycle of dissolution/precipitations with heptane/methanol. Subsequently, the Non-Random Copolymer 3 is evaluated to determine $T_g$, $M_n$, and PDI using DSC with a heating ramp rate of 10° C./min according to ASTM E1356 as described above and using gel permeation chromatography. The results of the DSC of Non-Random Copolymer 3 are set forth in FIG. 9. In addition, the $T_g$, $M_n$, and PDI are set forth in Table 1 below wherein all amounts are in grams unless otherwise indicated Formation of Non-random Copolymer 4:

Non-Random Copolymer 4 is formed in the same way and with the same reactants as Non-Random Copolymer 3 except that the mixture is added dropwise at a rate of 2.5 mL/min to the methylmethacrylate and acetic acid being stirred at room temperature. This corresponds to a rate of addition of approximately 0.01075 moles of monomethacryloxypropyl terminated polydimethylsiloxane per minute added to one mole of methylmethacrylate, calculated using formula I above. After formation, the Non-Random Copolymer 4 is evaluated to determine $T_g$, $M_n$, and PDI using DSC with a heating ramp rate of 10° C./min according to ASTM E1356 as described above and using gel permeation chromatography. The results of the DSC of Non-Random Copolymer 4 are set forth in FIG. 10. In addition, the $T_g$, $M_n$, and PDI are set forth in Table 1 below wherein all amounts are in grams unless otherwise indicated Formation of Random (Comparative) Copolymers:

Four random copolymers (Random Copolymers 1-4) are formed as comparative examples and do not represent the instant invention. After formation, each of the Random Copolymers 1-4 is evaluated to determine Glass Transition Temperature ($T_g$), Number Average Molecular Weight ($M_n$), and Polydispersity index (PDI).

Formation of Random Copolymer 1:

Random Copolymer 1 is formed by adding 1.25 grams of triethylborane-propane diamine as an organoborane initiator and 1.5 grams of ethyl acetate as a solvent, to a jar to form a first mixture. The first mixture is thoroughly mixed and loaded into a syringe. In addition, 5 grams of monomethacryloxypropyl terminated polydimethylsiloxane as a first radical polymerizable compound, 5 grams of methyl methacrylate as a second radical polymerizable compound, 1.5 grams of ethyl acetate as a solvent, and 1.8 grams of acetic acid as an organoborane decomplexing agent, are added to a second jar to form a second mixture. The second mixture is thoroughly mixed and stirred with a magnetic stir bar at 500 RPM. Subsequently, the first mixture is added dropwise at a rate of 0.5 mL/min to the second mixture that is stirred at room temperature. This addition does not have a corresponding rate of addition calculated using either of the formulae I or II above and is not representative of the instant invention.

Figure 11:
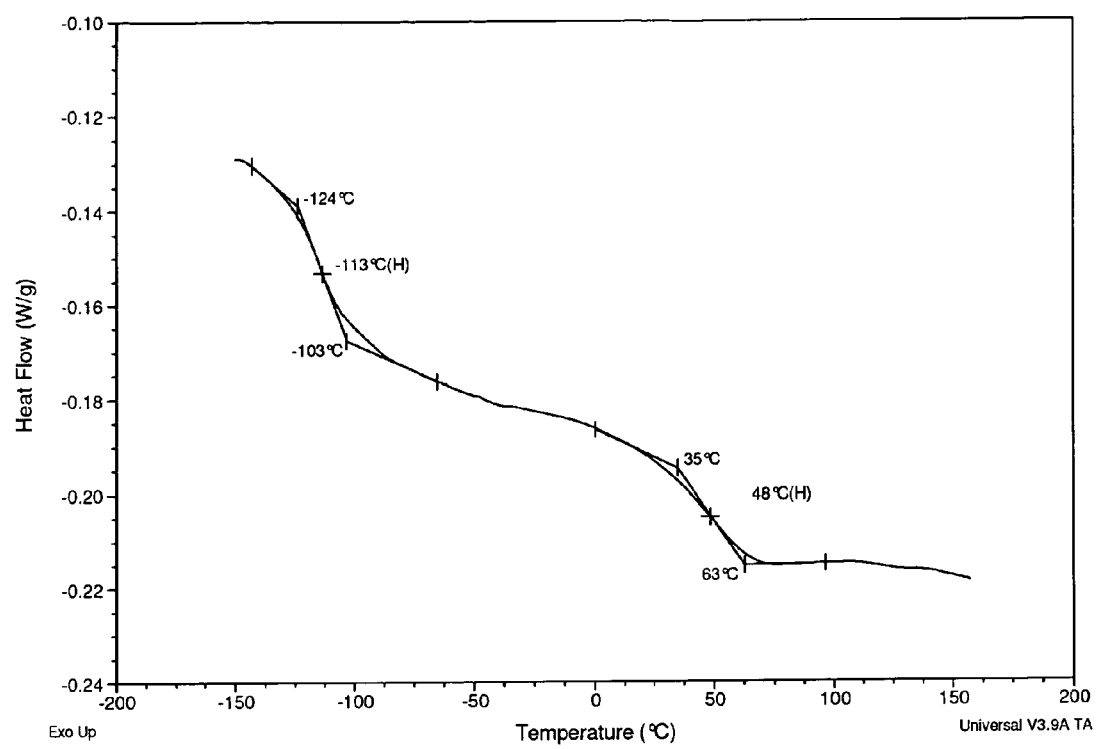
FIG. 11 illustrates results of differential scanning calorimetry of Random Copolymer 1, which is a first comparative example set forth in the Examples that has two distinct glass transition temperatures with the higher glass transition temperature having a breadth of 28° C.
Figure 12:
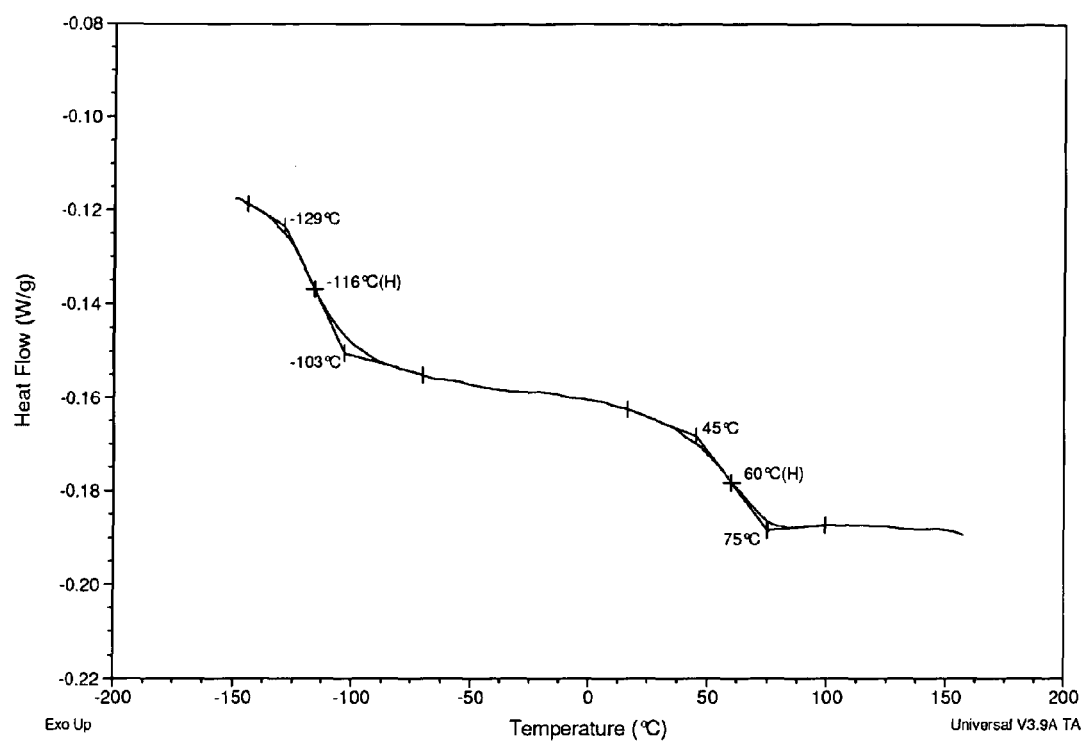
FIG. 12 illustrates results of differential scanning calorimetry of Random Copolymer 2, which is a second comparative example set forth in the Examples that has two distinct glass transition temperatures with the higher glass transition temperature having a breadth of 30° C.
Figure 13:
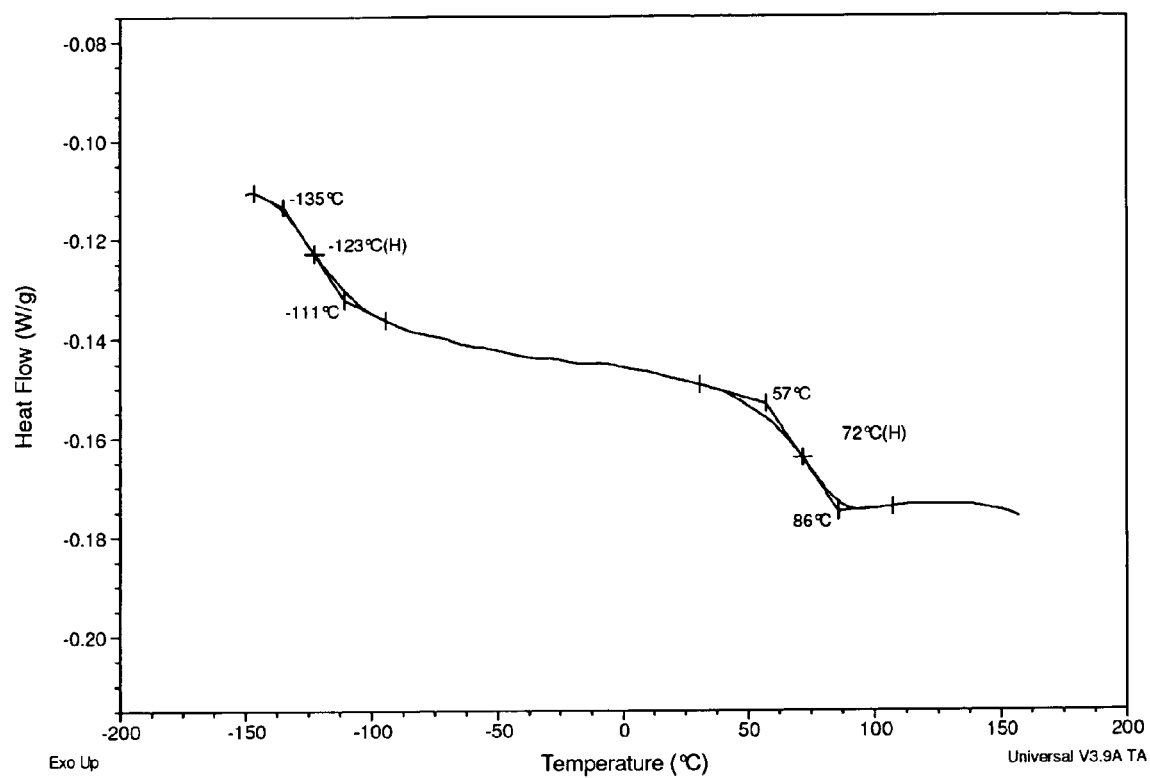
FIG. 13 illustrates results of differential scanning calorimetry of Random Copolymer 3, which is a third comparative example set forth in the Examples that has two distinct glass transition temperatures with the higher glass transition temperature having a breadth of 29° C.
Figure 14:
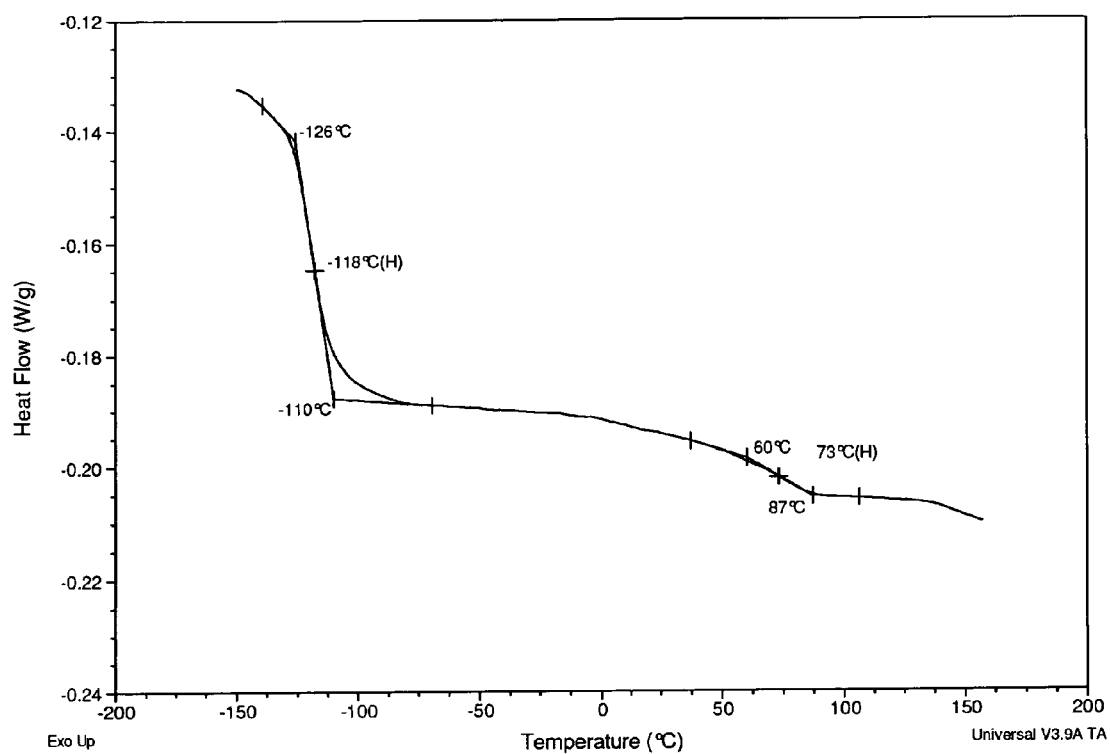
FIG. 14 illustrates results of differential scanning calorimetry of Random Copolymer 4, which is a fourth comparative example set forth in the Examples that has two distinct glass transition temperatures with the higher glass transition temperature having a breadth of 27° C.

The monomethacryloxypropyl terminated polydimethylsiloxane and the methylmethacrylate are allowed to react (i.e., polymerize), for 34 minutes to form the Random Copolymer 1. After 34 minutes, an amount of the Random Copolymer 1 is precipitated in methanol followed by one cycle of dissolution/precipitation with heptane/methanol. Subsequently, the Random Copolymer 1 is evaluated to determine $T_g$, $M_n$, and PDI using DSC according to ASTM E1356 at a heating rate of 10° C./min as described above and using gel permeation chromatography. The results of the DSC of Random Copolymer 1 are set forth in FIG. 11. In addition, the $T_g$, $M_n$, and PDI are set forth in Table 1 below wherein all amounts are in grams unless otherwise indicated Formation of Random Copolymer 2:

Random Copolymer 2 is formed by adding 10 grams of monomethacryloxypropyl terminated polydimethylsiloxane as a first radical polymerizable compound, 2.5 grams of triethylborane-propane diamine as an organoborane initiator, and 10 grams of ethyl acetate as a solvent, to a jar to form a mixture. The mixture is thoroughly mixed and loaded into a syringe. In addition, 10 grams of methylmethacrylate as a second radical polymerizable compound, and 3.5 grams of acetic acid as an organoborane decomplexing agent, are added to a second jar. The methylmethacrylate and acetic acid is thoroughly mixed and stirred with a magnetic stir bar at 500 RPM. The mixture is then added dropwise at a rate of 5.0 mL/min to the methylmethacrylate and acetic acid being stirred at room temperature. This corresponds to a rate of addition of approximately 0.02152 moles of monomethacryloxypropyl terminated polydimethylsiloxane per minute added to one mole of methylmethacrylate, calculated using formula I above. The monomethacryloxypropyl terminated polydimethylsiloxane and the methylmethacrylate are allowed to react (i.e., polymerize), for 34 minutes to form the Random Copolymer 2. After 34 minutes, an amount of the Random Copolymer 2 is precipitated in methanol followed by one cycle of dissolution/precipitations with heptane/methanol. Subsequently, the Random Copolymer 2 is evaluated to determine $T_g$, $M_n$, and PDI using DSC with a heating ramp rate of 10° C./min according to ASTM E1356 as described above and using gel permeation chromatography. The results of the DSC of Random Copolymer 2 are set forth in FIG. 12. In addition, the $T_g$, $M_n$, and PDI are set forth in Table 1 below wherein all amounts are in grams unless otherwise indicated Formation of Random Copolymer 3:

Random Copolymer 3 is formed by adding 10 grams of monomethacryloxypropyl terminated polydimethylsiloxane as a first radical polymerizable compound, 2.5 grams of triethylborane-propane diamine as an organoborane initiator, and 10 grams of ethyl acetate as a solvent, to a jar to form a mixture. The mixture is thoroughly mixed and loaded into a syringe. In addition, 10 grams of methylmethacrylate as a second radical polymerizable compound, and 3.5 grams of acetic acid as an organoborane decomplexing agent, are added to a second jar. The methylmethacrylate and acetic acid is thoroughly mixed and stirred with a magnetic stir bar at 500 RPM. The mixture is then added as a whole (i.e., dumped in) to the methylmethacrylate and acetic acid being stirred at room temperature. Because the first radical polymerizable compound is added essentially instantaneously (i.e., in a rapid and unmeasured rate) to the second radical polymerizable compound, this combination of the first and second radical polymerizable compounds, as a whole, has a higher rate of addition than what is sufficient to form a non-random copolymer calculated using either of the formulae I or II above. The monomethacryloxypropyl terminated polydimethylsiloxane and the methylmethacrylate are allowed to react (i.e., polymerize), for 34 minutes to form the Random Copolymer 3. After 34 minutes, an amount of the Random Copolymer 3 is precipitated in methanol followed by one cycle of dissolution/ precipitations with heptane/methanol. Subsequently, the Random Copolymer 3 is evaluated to determine $T_g$, $M_n$, and PDI using DSC with a heating ramp rate of 10° C./min according to ASTM E1356 as described above and using gel permeation chromatography. The results of the DSC of Random Copolymer 3 are set forth in FIG. 13. In addition, the $T_g$, $M_n$, and PDI are set forth in Table 1 below wherein all amounts are in grams unless otherwise indicated Formation of Random Copolymer 4:

Random Copolymer 4 is formed by adding 20 grams of monomethacryloxypropyl terminated polydimethylsiloxane as a first radical polymerizable compound, 5 grams of triethylborane-propane diamine as an organoborane initiator, and 20 grams of ethyl acetate as a solvent, to a jar to form a mixture. The mixture is thoroughly mixed and loaded into a syringe. In addition, 10 grams of methylmethacrylate as a second radical polymerizable compound, and 7 grams of acetic acid as an organoborane decomplexing agent, are added to a second jar. The methylmethacrylate and acetic acid is thoroughly mixed and stirred with a magnetic stir bar at 500 RPM. The mixture is then added as a whole (e.g. dumped in) to the methylmethacrylate and acetic acid being stirred at room temperature. Because the first radical polymerizable compound is added essentially instantaneously (i.e., in a rapid and unmeasured rate) to the second radical polymerizable compound, this combination of the first and second radical polymerizable compounds, as a whole, has a higher rate of addition than what is sufficient to form a non-random copolymer. The monomethacryloxypropyl terminated polydimethylsiloxane and the methylmethacrylate are allowed to react (i.e., polymerize), for 34 minutes to form the Random Copolymer 3. After 34 minutes, an amount of the Random Copolymer 4 is precipitated in methanol followed by one cycle of dissolution/precipitations with heptane/methanol. Subsequently, the Random Copolymer 4 is evaluated to determine $T_g$, $M_n$, and PDI using DSC with a heating ramp rate of 10° C./min according to ASTM E1356 as described above and using gel permeation chromatography. The results of the DSC of Random Copolymer 4 are set forth in FIG. 14. In addition, the $T_g$, $M_n$, and PDI are set forth in Table 1 below wherein all amounts are in grams unless otherwise indicated

TABLE 1

|   | Non-Random Copolymer 1 | Non-Random Copolymer 2 | Non-Random Copolymer 3 | Non-Random Copolymer 4 |
|---|---|---|---|---|
| Solvent | 10 | 10 | 20 | 10 |
| First Radical Polymerizable Compound | 10 | 10 | 20 | 10 |
| Organoborane Initiator | 2.5 | 2.5 | 5 | 2.5 |
| Second Radical Polymerizable Compound | 10 | 10 | 20 | 10 |
| Organoborane Decomplexing Agent | 3.5 | 3.5 | 7 | 3.5 |
| Rate of Addition (mL/min) | 0.5 | 1.0 | 2.0 | 2.5 |
| Rate of Addition Formula I | 0.00215 | 0.00430 | 0.00430 | 0.01075 |
| Glass Transition Temperature Attributable to First Radical Polymerizable Compound (Lower, Onset) (° C.) | −128 | −125 | −132 | −124 |
| Δ Glass Transition Temperature (Lower) (° C.) | 20 | 18 | 22 | 19 |
| Glass Transition Temperature (Upper, Onset) (° C.) | 89 | 91 | 54 | 24 |
| Δ Glass Transition Temperature (Upper) (° C.) | 18 | 13 | 55 | 40 |
| Number Average Molecular Weight ($M_n$) (g/mol) | 10,800 | 10,600 | 14,700 | 12,600 |
| Polydispersity Index (PDI) | 1.7 | 1.6 | 1.9 | 1.5 |

|   | Random Copolymer 1 | Random Copolymer 2 | Random Copolymer 3 | Random Copolymer 4 |
|---|---|---|---|---|
| Solvent | 3 | 10 | 10 | 20 |
| First Radical Polymerizable Compound | 5 | 10 | 10 | 20 |
| Organoborane Initiator | 1.25 | 2.5 | 2.5 | 5 |

TABLE 1-continued

| | | | | |
|---|---|---|---|---|
| Second Radical Polymerizable Compound | 5 | 10 | 10 | 20 |
| Organoborane Decomplexing Agent | 1.8 | 3.5 | 3.5 | 7 |
| Rate of Addition (mL/min) | 0.5 | 5.0 | N/A | N/A |
| Rate of Addition Formula I | N/A | 0.02152 | N/A | N/A |
| Glass Transition Temperature Attributable to First Radical Polymerizable Compound (Lower, Onset) (° C.) | −124 | −129 | −135 | −126 |
| Δ Glass Transition Temperature (Lower) (° C.) | 21 | 26 | 24 | 16 |
| Glass Transition Temperature (Upper, Onset) (° C.) | 35 | 45 | 57 | 60 |
| Δ Glass Transition Temperature (Upper) (° C.) | 28 | 30 | 29 | 27 |
| Number Average Molecular Weight ($M_n$) (g/mol) | 11,400 | 21,700 | 35,900 | 22,600 |
| Polydispersity Index (PDI) | 1.6 | 1.5 | 2.2 | 10.6 |

As set forth above, the solvent is ethyl acetate.

The First Radical Polymerizable Compound is monomethacryloxypropyl terminated polydimethylsiloxane having a degree of polymerization of about 10 and commercially available from Gelest, Inc. of Morrisville, Pa. under the commercial name MCR-M11.

The Organoborane Initiator is triethylborane-propane diamine.

The Second Radical Polymerizable Compound is methylmethacrylate.

The Organoborane Decomplexing Agent is acetic acid.

The Formula I used to calculate the rate of addition is:

$$\frac{\text{Moles of the} (MCR\text{-}M11)/\text{min}}{\text{Moles of the methylmethacrylate}}$$

The Glass Transition Temperatures are determined using DSC with a heating ramp rate of 10° C./min according to ASTM E1356 as described above.

The Number Average Molecular Weight ($M_n$) and Polydispersity Index (PDI) are each independently determined using gel permeation chromatography at relative to polystyrene (PS) standards in THF with a flow rate of 1 mL/min.

The data set forth in Table 1 above indicates that the instant method forms Block and Gradient Copolymers and depends on a rate of addition of the first and second radical polymerizable compound. The Figures that refer to the data in Table 1 also illustrate the formation of block and gradient copolymers by the method of this invention and the comparative formation of random copolymers that do not represent this invention. More specifically, the DSC of each of the FIGS. 7-14 illustrates a first glass transition temperature lower than −100° C. which corresponds to a PDMS side chain of each of the copolymers. The DSC of each of these Figures also illustrates a second glass transition temperature that is above 0° C. that corresponds to a PMMA side chain of each of the copolymers and that is used to characterize each of the copolymers as a block, gradient, or random copolymer.

Figure 7:
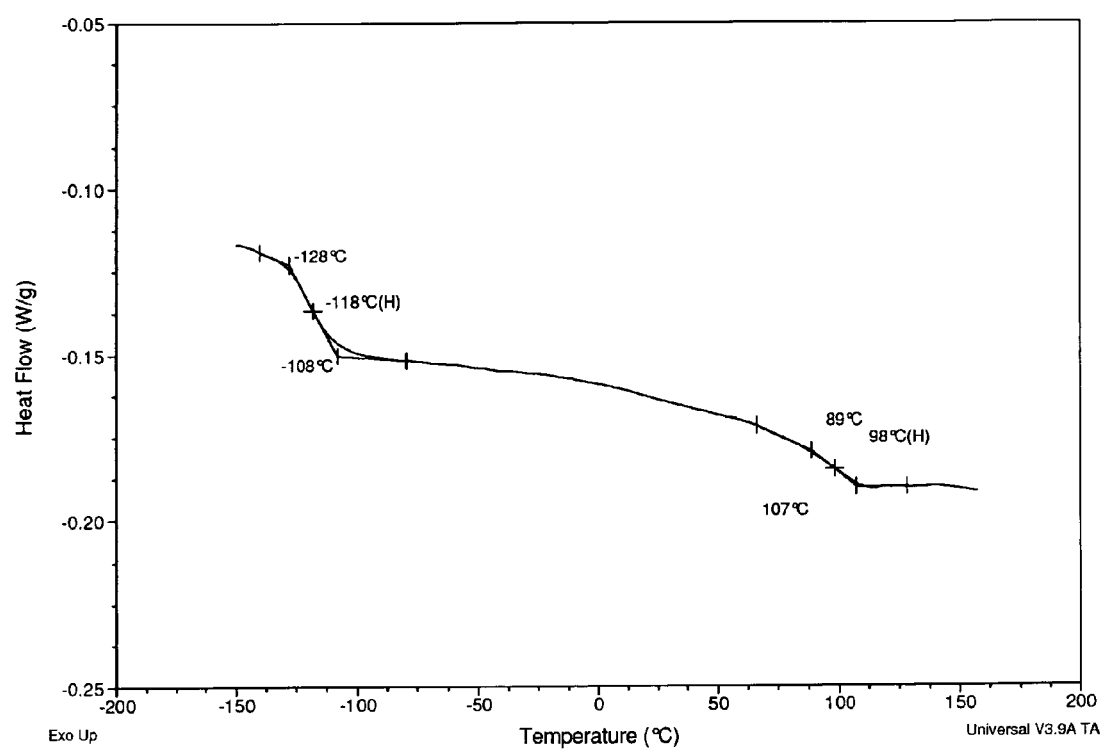
FIG. 7 illustrates results of differential scanning calorimetry of Non-Random Copolymer 1 of the instant Examples having two distinct glass transition temperatures that have breadths of 20° C. and 18° C., respectively.
Figure 8:
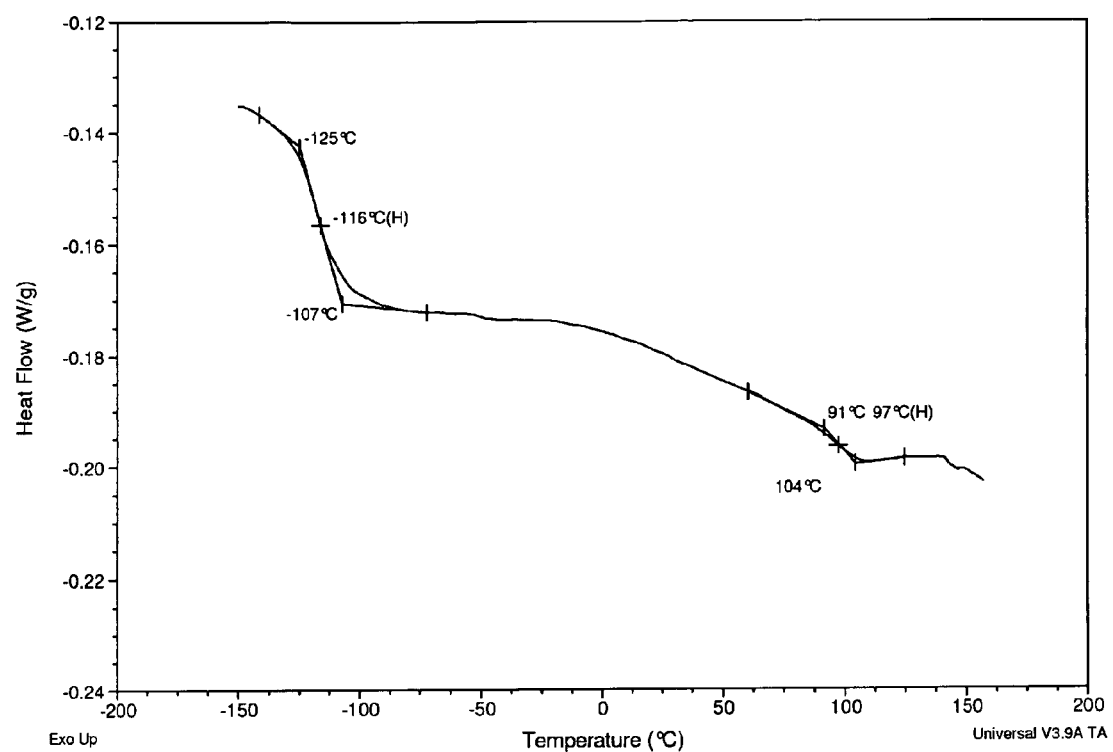
FIG. 8 illustrates results of differential scanning calorimetry of Non-Random Copolymer 2 of the instant Examples having two distinct glass transition temperatures that have breadths of 18° C. and 13° C., respectively.

As set forth in FIGS. 7 and 8, the DSC generally illustrates formation of block copolymers as indicated by two distinct glass transitions or phases, each characteristic of a single block of PDMS or PMMA units. As set forth in FIGS. 9 and 10, the DSC generally illustrates formation of gradient copolymers as indicated by a broad breadth of the second glass transition temperature. This broad breadth is thought to indicate a gradient formed from PDMS and PMMA units in the copolymers. As set forth in FIGS. 11-14, the DSC generally illustrates a narrow breadth of the second glass transition temperature. This narrow breadth is thought to indicate random PDMS and PMMA units in the copolymers.

Accordingly, the above data suggest that the organoborane initiator and the instant method allow for the formation of the block and gradient copolymers with inexpensive processing steps and at low temperatures thereby reducing costs. Furthermore, the organoborane initiator and the method allow non-random copolymers to be formed with narrow polydispersity indices, in high yields, and without the need for heavy metal catalysts.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A silicon gradient copolymer comprising a polymerization product of:
   i. a first radical polymerizable compound comprising at least one silicon atom; and ii. a second radical polymerizable compound, wherein said first radical polymerizable compound and said second radical polymerizable compound are polymerized in the presence of an organoborane-organonitrogen complex and an organoborane decomplexing agent, and wherein said gradient polymer has a polymer backbone consisting of organic moieties and has at least one silicon-containing group pending from said polymer backbone, and comprising 10 to 10,000 parts by weight of boron per one million parts by weight of said first and second radical polymerizable compounds.

2. A gradient copolymer as set forth in claim 1 having at least one glass transition temperature that has a breadth of at least 25° C.

3. A gradient copolymer as set forth in claim 1 wherein said first and second radical polymerizable compounds are different from each other and each is independently selected from the group of an organosilane, an organopolysiloxane, and combinations thereof.

4. A gradient copolymer as set forth in claim 1 wherein said first radical polymerizable compound is selected from the group of an organosilane, an organopolysiloxane, and combinations thereof and said second radical polymerizable compound is organic and free of silicon atoms.

5. A gradient copolymer as set forth in claim 4 wherein said first radical polymerizable compound is further defined as a polyorganosiloxane having the average unit formula:

$(R'_3SiO_{1/2})_x(R'_2SiO_{2/2})_y(R'SiO_{3/2})_z$ wherein x and y are positive numbers, z is greater than or equal to zero, and at least one R' is a free radical polymerizable group, and said second radical polymerizable compound is selected from the group of acrylates, alkenoates, carbonates, phthalates, acetates, itaconates, and combinations thereof.

6. A gradient copolymer as set forth in claim 5 wherein said polyorganosiloxane is further defined as an acrylate- or methacrylate-functional polyorganosiloxane.

7. A gradient copolymer as set forth in claim 6 wherein said polyorganosiloxane is further defined as monomethacryloxypropyl terminated polydimethylsiloxane.

8. A gradient copolymer as set forth in claim 4 wherein said second radical polymerizable compound is further defined as an acrylate.

9. A gradient copolymer as set forth in claim 1 wherein one of said first and second radical polymerizable compounds is further defined as an organosilane having the general structure:

$R_nSi(OR')_{4-n}$ wherein n is an integer of less than or equal to 4; and wherein at least one of R and R' independently comprises a free radical polymerizable group, and the other is selected from the group of acrylates, alkenoates, carbonates, phthalates, acetates, itaconates, and combinations thereof.

10. A gradient copolymer as set forth in claim 1 wherein said first and second radical polymerizable compounds are different from each other and said second radical polymerizable compound is organic and free of silicon atoms.

11. A gradient copolymer as set forth in claim 1 wherein said first radical polymerizable compound is selected from the group of an organosilane, an organopolysiloxane, and combinations thereof and said second radical polymerizable compounds is further defined as an organic macromonomer that is free of silicon atoms.

12. A gradient copolymer as set forth in claim 1 wherein said organoborane-organonitrogen complex is further defined as an organoborane-amine complex.

13. A method of forming a silicon gradient copolymer comprising a polymerization product of a first radical polymerizable compound comprising at least one silicon atom and a second radical polymerizable compound and also comprising 10 to 10,000 parts by weight of boron per one million parts by weight of the first and second radical polymerizable compounds, said method comprising the step of combining (1) a mixture of the first radical polymerizable compound and an organoborane-organonitrogen complex comprising a concentration of boron, (2) the second radical polymerizable compound, and (3) an organoborane decomplexing agent, at a rate sufficient to form the silicon gradient copolymer.

14. A method as set forth in claim 13 wherein one of the first and second radical polymerizable compounds is selected from the group of an organosilane, an organopolysiloxane, and combinations thereof, and the other of the first and second radical polymerizable compounds is organic and free of silicon atoms.

15. A method as set forth in claim 14 wherein one of the first and second radical polymerizable compounds is further defined as a polyorganosiloxane having the average unit formula:

$(R'_3SiO_{1/2})_x(R'_2SiO_{2/2})_y(R'SiO_{3/2})_z$ wherein x and y are positive numbers, z is greater than or equal to zero, and at least one R' is a free radical polymerizable group, and the other of the first and second radical polymerizable compounds is selected from the group of acrylates, alkenoates, carbonates, phthalates, acetates, itaconates, and combinations thereof.

16. A method as set forth in claim 15 wherein the polyorganosiloxane is further defined as monomethacryloxypropyl terminated polydimethylsiloxane.

17. A method as set forth in claim 13 wherein the second radical polymerizable compound and the organoborane decomplexing agent are combined before combination with the mixture of the first radical polymerizable compound and the organoborane-organonitrogen complex.

18. A method as set forth in any claim 13 wherein the step of combining is further defined as adding the mixture of the first radical curable compound and the organoborane-organonitrogen complex to a mixture of the second radical polymerizable compound and the organoborane decomplexing agent.

19. A method as set forth in claim 13 wherein the silicon gradient copolymer has at least one glass transition temperature that has a breadth of at least 25° C. and the step of combining is further defined as adding the mixture of the first radical polymerizable compound and the organoborane-organonitrogen complex to a mixture of the second radical polymerizable compound and the organoborane decomplexing agent at a rate of from greater than 0.0043 to 0.015 moles of the first radical polymerizable compound per minute per mole of the second radical polymerizable compound.

20. A method as set forth in claim 13 wherein the step of combining is further defined as adding droplets of the mixture to the second radical polymerizable compound.

21. A method as set forth in claim 20 wherein the step of adding droplets is further defined as spraying the mixture.

22. A method as set forth in claim 13 wherein the first and second radical polymerizable compounds are polymerized at a temperature of from 15° C. to 35° C.

23. A method as set forth in claim 1 wherein the silicon gradient copolymer has at least one glass transition temperature having a breadth of at least 25° C.

* * * * *